United States Patent
Izawa et al.

(10) Patent No.: US 10,244,210 B2
(45) Date of Patent: *Mar. 26, 2019

(54) CAMERA DEVICE FOR REFRIGERATOR AND REFRIGERATOR COMPRISING SAME

(71) Applicant: Toshiba Lifestyle Products & Services Corporation, Tokyo (JP)

(72) Inventors: Hirokazu Izawa, Tokyo (JP); Kazuhiro Furuta, Tokyo (JP); Yuuki Marutani, Tokyo (JP); Kota Watanabe, Tokyo (JP)

(73) Assignee: Toshiba Lifestyle Products & Services Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,945

(22) Filed: Feb. 8, 2018

(65) Prior Publication Data
US 2018/0167589 A1 Jun. 14, 2018

Related U.S. Application Data

(63) Continuation of application No. 15/456,979, filed on Mar. 13, 2017, now Pat. No. 9,924,140, which is a
(Continued)

(30) Foreign Application Priority Data

Aug. 28, 2013 (JP) .................. 2013-176757
Aug. 28, 2013 (JP) .................. 2013-176758
(Continued)

(51) Int. Cl.
*H04N 7/18* (2006.01)
*G03B 17/02* (2006.01)
(Continued)

(52) U.S. Cl.
CPC ........... *H04N 7/183* (2013.01); *F25D 23/028* (2013.01); *F25D 23/04* (2013.01); *F25D 23/12* (2013.01);
(Continued)

(58) Field of Classification Search
None
See application file for complete search history.

(56) References Cited

U.S. PATENT DOCUMENTS 9,661,281 B2 * 5/2017 Izawa .................. G03B 17/02
9,924,140 B2 * 3/2018 Izawa .................. G03B 17/02
(Continued)

FOREIGN PATENT DOCUMENTS

CN    101 790 082    7/2010
EP    1 030 521    8/2000
(Continued)

OTHER PUBLICATIONS

International Search Report (with English Translation) dated Sep. 16, 2014 issued in PCT/JP2014/071563.
(Continued)

*Primary Examiner* — William B Perkey
(74) *Attorney, Agent, or Firm* — DLA Piper LLP (US)

(57) ABSTRACT

A camera device for use in a storage unit includes a case configured to be detachably installable inside the storage unit to a holder unit configured to hold the case inside the storage unit, an image capturing element provided inside the case and configured to capture an image inside the storage unit where the case is installed, an image capture window provided on a first surface portion of the case and configured for capturing the image inside the storage unit by the image capturing element, and a preventing element configured to prevent the case from being attached to the holder unit in an orientation other than a predetermined orientation. The
(Continued)

image capture window is configured for capturing image inside the storage unit by the image capturing element. The holder unit holds the case inside the storage unit. The image capturing element captures the image inside the storage unit with the case being installed in the predetermined orientation.

18 Claims, 35 Drawing Sheets

Related U.S. Application Data continuation of application No. 15/053,552, filed on Feb. 25, 2016, now Pat. No. 9,661,281, which is a continuation of application No. PCT/JP2014/071563, filed on Aug. 18, 2014.

(30) Foreign Application Priority Data

Aug. 28, 2013 (JP) .................................. 2013-176759
Aug. 28, 2013 (JP) .................................. 2013-176760

(51) Int. Cl.
| | |
|---|---|
| *G03B 17/08* | (2006.01) |
| *F25D 23/04* | (2006.01) |
| *H04N 5/232* | (2006.01) |
| *H04N 5/235* | (2006.01) |
| *G03B 29/00* | (2006.01) |
| *F25D 27/00* | (2006.01) |
| *F25D 29/00* | (2006.01) |
| *F25D 23/02* | (2006.01) |
| *F25D 23/12* | (2006.01) |
| *H04N 5/225* | (2006.01) |

(52) U.S. Cl.
CPC ......... *F25D 27/005* (2013.01); *F25D 29/005* (2013.01); *G03B 17/02* (2013.01); *G03B 17/08* (2013.01); *G03B 29/00* (2013.01); *H04N 5/2252* (2013.01); *H04N 5/2254* (2013.01); *H04N 5/2257* (2013.01); *H04N 5/2351* (2013.01); *H04N 5/23206* (2013.01); *H04N 5/23238* (2013.01); *H04N 5/23241* (2013.01); *F25D 2323/021* (2013.01); *F25D 2700/02* (2013.01); *G03B 2206/00* (2013.01); *G03B 2217/007* (2013.01)

(56) References Cited

U.S. PATENT DOCUMENTS

| | | | | |
|---|---|---|---|---|
| 2005/0049461 | A1* | 3/2005 | Honda | A61B 1/041 |
| | | | | 600/160 |
| 2008/0014917 | A1 | 1/2008 | Rhoads et al. | |
| 2011/0019001 | A1 | 1/2011 | Rhoads et al. | |
| 2011/0122260 | A1* | 5/2011 | Nakamura | G03B 17/02 |
| | | | | 348/207.1 |
| 2012/0023971 | A1* | 2/2012 | Min | F25D 29/00 |
| | | | | 62/62 |
| 2013/0052616 | A1 | 2/2013 | Silverstein et al. | |
| 2014/0180847 | A1 | 6/2014 | Silverstein et al. | |
| 2014/0293060 | A1* | 10/2014 | Ryu | H04N 5/2252 |
| | | | | 348/159 |
| 2014/0347553 | A1* | 11/2014 | Ovsiannikov | H04N 5/2256 |
| | | | | 348/367 |
| 2016/0033194 | A1* | 2/2016 | Sumihiro | F25D 23/04 |
| | | | | 62/125 |
| 2016/0138859 | A1* | 5/2016 | Stimpfig | F25D 27/005 |
| | | | | 62/125 |
| 2016/0182868 | A1* | 6/2016 | Izawa | G03B 17/02 |
| | | | | 62/125 |

FOREIGN PATENT DOCUMENTS

| | | |
|---|---|---|
| JP | H03-123335 | 5/1991 |
| JP | H11-281766 | 10/1999 |
| JP | 2000-305136 | 11/2000 |
| JP | 2001-190932 | 7/2001 |
| JP | 2002-340471 | 11/2002 |
| JP | 2004-179850 | 6/2004 |
| JP | 2004-183987 | 7/2004 |
| JP | 2005-065090 | 3/2005 |
| JP | 2007-086676 | 4/2007 |
| JP | 2007-329823 | 12/2007 |
| JP | 2009-522940 | 6/2009 |
| JP | 2010-098161 | 4/2010 |
| JP | 2001-294308 | 10/2011 |
| JP | 2012-027422 | 2/2012 |
| JP | 2013-109188 | 6/2013 |
| WO | WO 2011-004569 | 1/2011 |

OTHER PUBLICATIONS

Written Opinion (with English Translation) dated Sep. 16, 2014 issued in PCT/JP2014/071563.
International Preliminary Report on Patentability dated Mar. 1, 2016 issued in PCT/JP2014/071563.
English Language Translation of JP 2009-522940 issued Jun. 11, 2009.
English Language Translation of JP 2001-294308 issued Oct. 23, 2011.
English Language Translation of JP 2005-065090 issued Mar. 10, 2005.
Taiwanese Office Action (with English translation) issued in TW 103128724 dated Aug. 18, 2016.
Japanese Office Action (with English Translation) issued in JP 2013-176757 dated Sep. 27, 2016.
Japanese Office Action (with English Translation) issued in JP 2013-176758 dated Sep. 27, 2016.
Japanese Office Action (with English Translation) issued in JP 2013-176759 dated Sep. 27, 2016.
Japanese Office Action (with English Translation) issued in JP 2013-176760 dated Sep. 27, 2016.
Japanese Office Action (with English Translation) issued in JP 2013-176758 dated Dec. 6, 2016.
English Language Translation of JP 2000-305136 issued Nov. 2, 2000.
English Language Translation of JP 2001-190932 issued Jul. 17, 2001.
English Language Translation of JP 2002-340471 issued Nov. 27, 2002.
English Language Translation of JP 2004-179850 issued Jun. 24, 2004.
English Language Translation of JP 2004-183987 issued Jul. 2, 2004.
English Language Translation of JP 2007-086676 issued Apr. 5, 2007.
English Language Translation of JP 2007-329823 issued Dec. 20, 2007.
English Language Translation of JP 2012-027422 issued Feb. 9, 2012.
English Language Translation of JP 2013-109188 issued Jun. 6, 2013.
English Language Translation of JP H03-123335 issued May 27, 1991.
English Language Translation of WO 2011-004569 issued Jan. 13, 2011.
Extended European Search Report issued in EP 14840776 dated Feb. 9, 2017.
Taiwanese Office Action issued in TW 103128724 dated Feb. 15, 2017.
Japanese Office Action (with English Translation) issued in JP 2013-176757 dated Apr. 4, 2017.
Japanese Office Action (with English Translation) issued in JP 2013-176759 dated Apr. 4, 2017.

(56) References Cited

OTHER PUBLICATIONS

Japanese Office Action (with English Translation) issued in JP 2013-176760 dated Apr. 4, 2017.
Japanese Office Action (with English Translation) issued in JP 2013-176758 dated Apr. 25, 2017.
Japanese Office Action (with English Translation) issued in JP 2013-176759 dated Oct. 3, 2017.
European Search Report issued in EP 18 21 3206 dated Jan. 24, 2019.
Japanese Office Action issued in JP 2017-243677 dated Jan. 22, 2019.

* cited by examiner

CAMERA DEVICE FOR REFRIGERATOR AND REFRIGERATOR COMPRISING SAME

CROSS-REFERENCE TO RELATED APPLICATION(S)

This application is a continuation of U.S. application Ser. No. 15/456,979, filed Mar. 13, 2017, which is a continuation of U.S. application Ser. No. 15/053,552, filed May 25, 2016, now U.S. Pat. No. 9,661,281, which is a continuation of International Application No. PCT/JP2014/71563, filed on Aug. 18, 2014 which is based upon and claims the benefit of priority from Japanese Patent Application No. 2013-176757, filed on, Aug. 28, 2013; Japanese Patent Application No. 2013-176758, filed on, Aug. 28, 2013; Japanese Patent Application No. 2013-176759, filed on, Aug. 28, 2013; and Japanese Patent Application No. 2013-176760, filed on, Aug. 28, 2013 the entire contents of which are incorporated herein by reference.

FIELD

Embodiments disclosed herein relate to a camera device for use in a storage and a storage provided with the camera device.

BACKGROUND

A storage such as a refrigerator provided with a camera device, etc. is known which allows information of food, etc. stored therein to be acquired from remote locations.

However, a storage such as a refrigerator described above does not necessarily provide good environment for capturing images and thus, there are problems specific to camera devices used in such environment that need to be overcome.

BRIEF DESCRIPTIONS OF THE DRAWINGS

FIG. 1 pertains to a first embodiment and is a schematic view illustrating an in-room image capturing system using a camera device.

Figure 11:
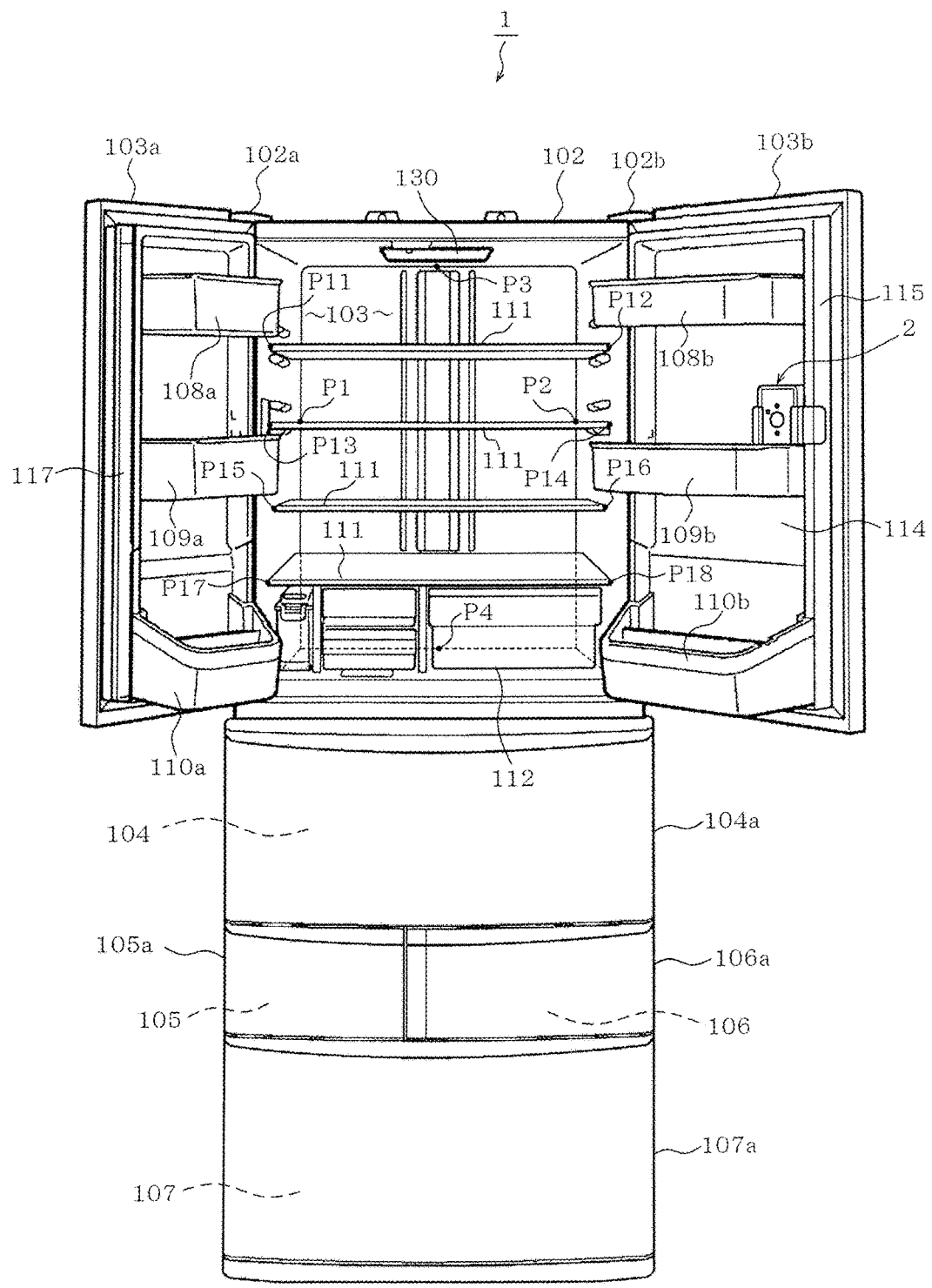
FIG. 11 is a perspective view with some of the doors of the refrigerator opened.
Figure 22:
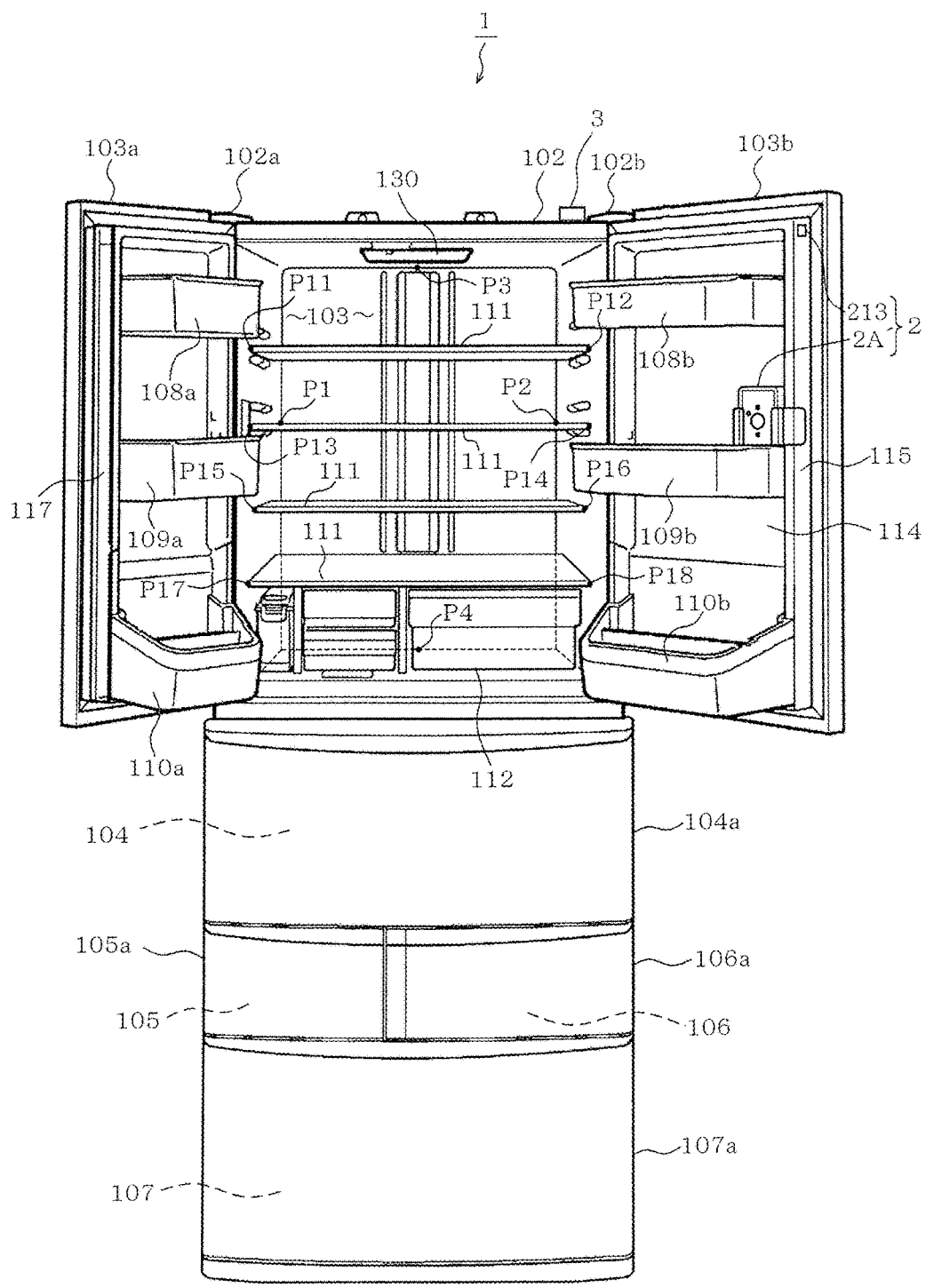

FIG. 22 pertains to a second embodiment and corresponds to FIG. 11.

Figure 23:
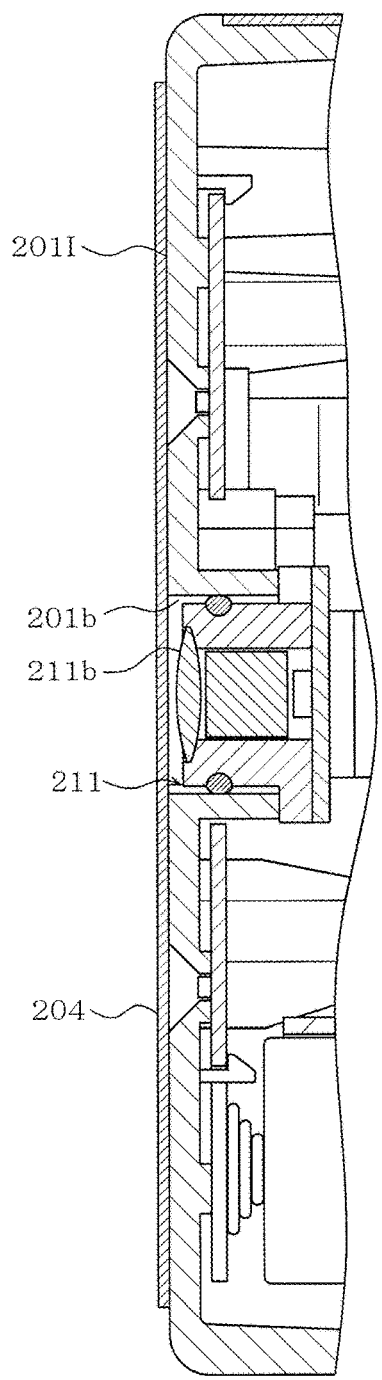

FIG. 23 pertains to a third embodiment and illustrates a vertical cross-sectional view of a first surface of a case.

Figure 24:
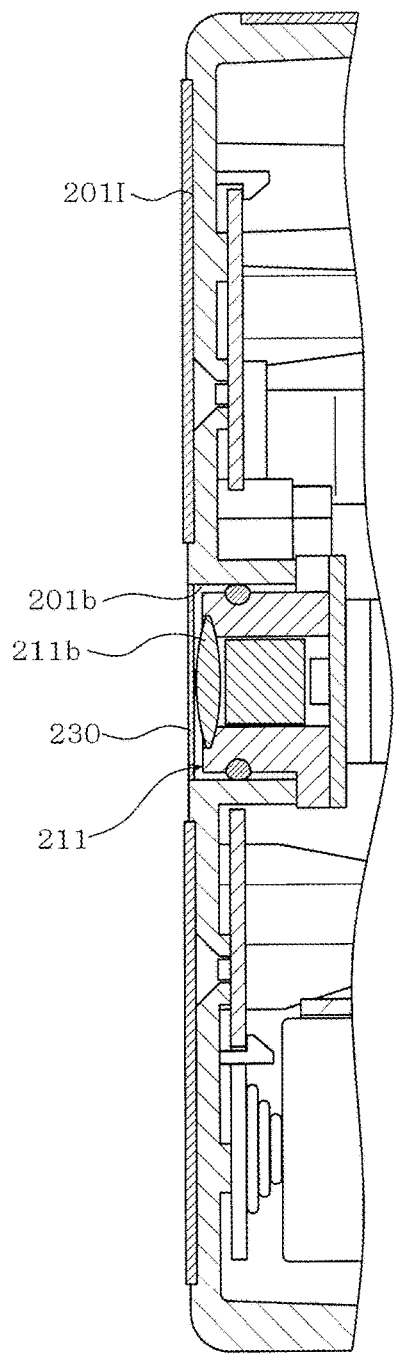

FIG. 24 illustrates one example of a water proof element and corresponds to FIG. 23.

Figure 17:
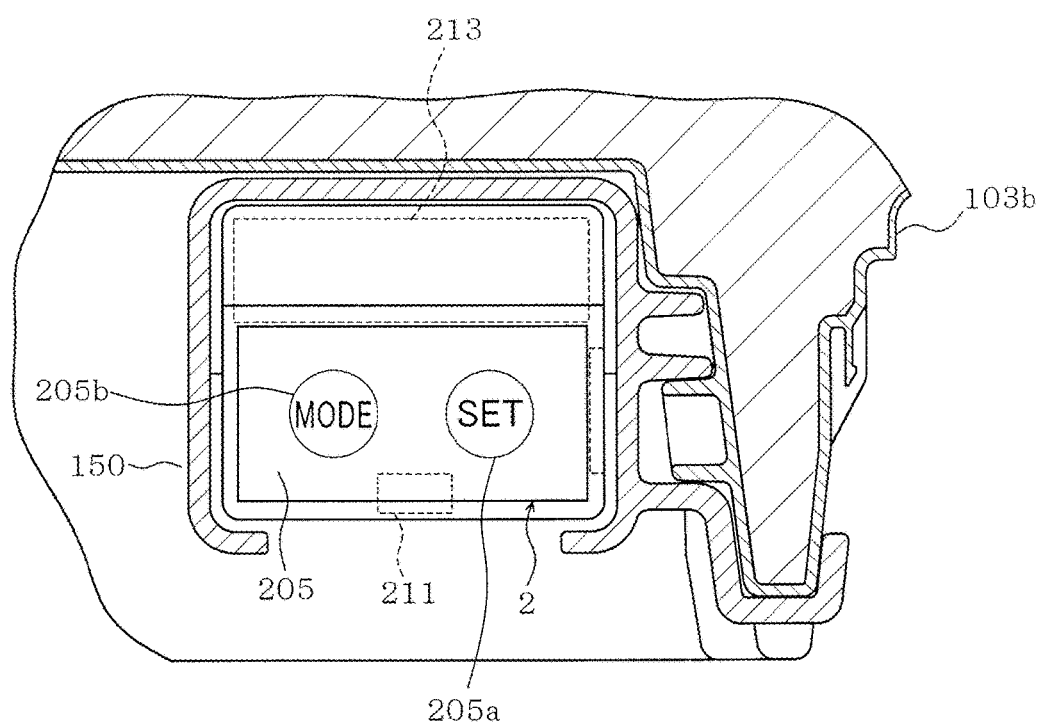
FIG. 17 is a plan view of a camera device installed in the holder case.
Figure 25:
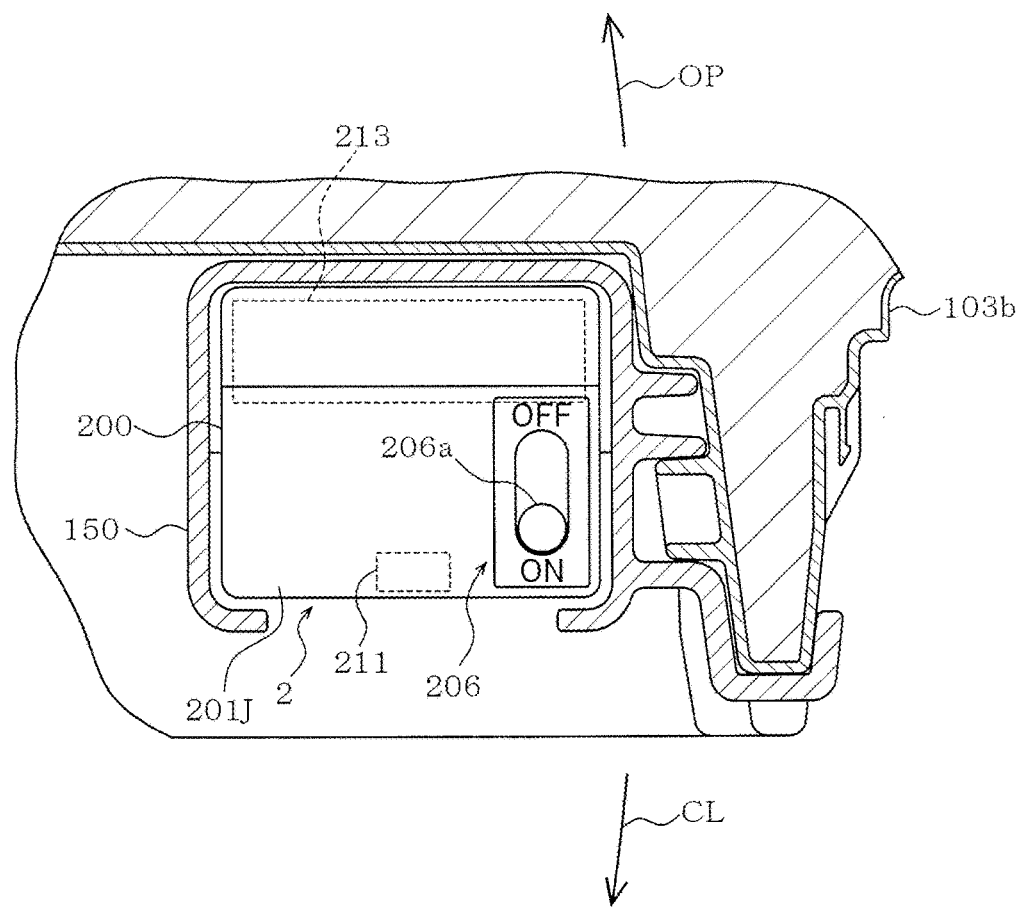

FIG. 25 illustrates a slide switch of a fourth embodiment and corresponds to FIG. 17.

Figure 26:
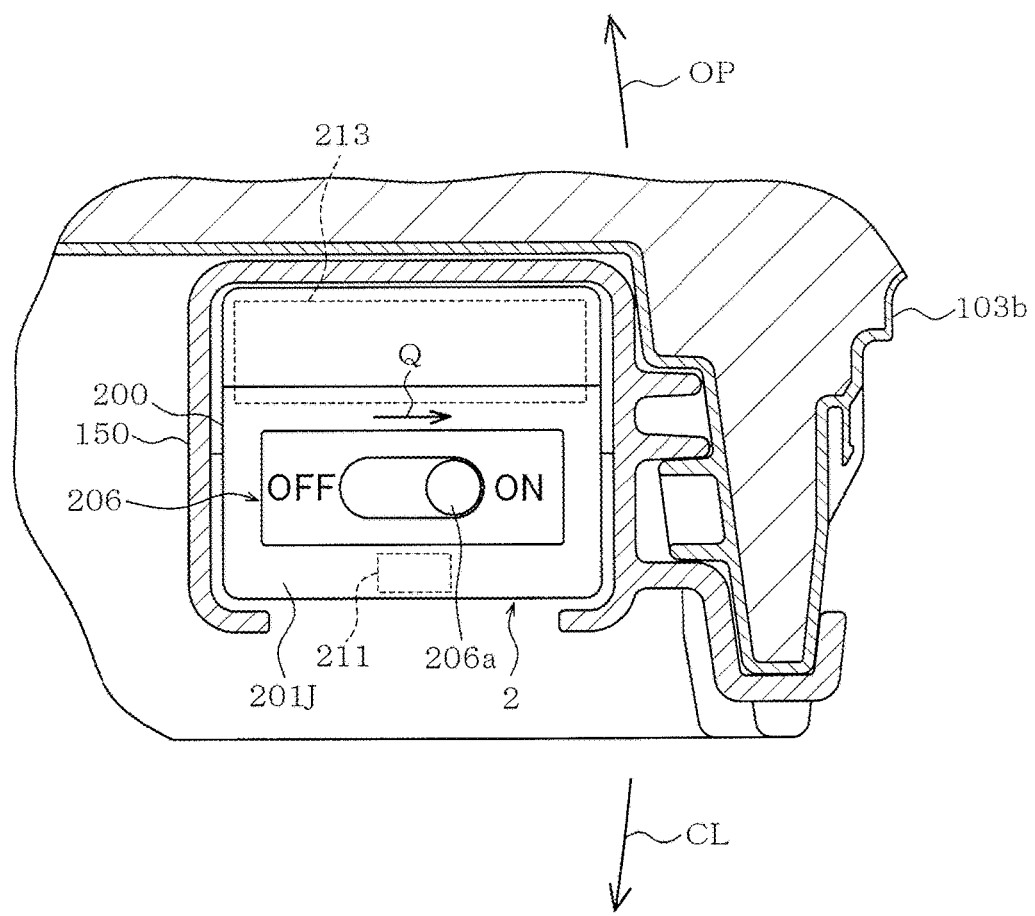

FIG. 26 illustrates another embodiment of a slide switch and corresponds to FIG. 17.

Figure 12:
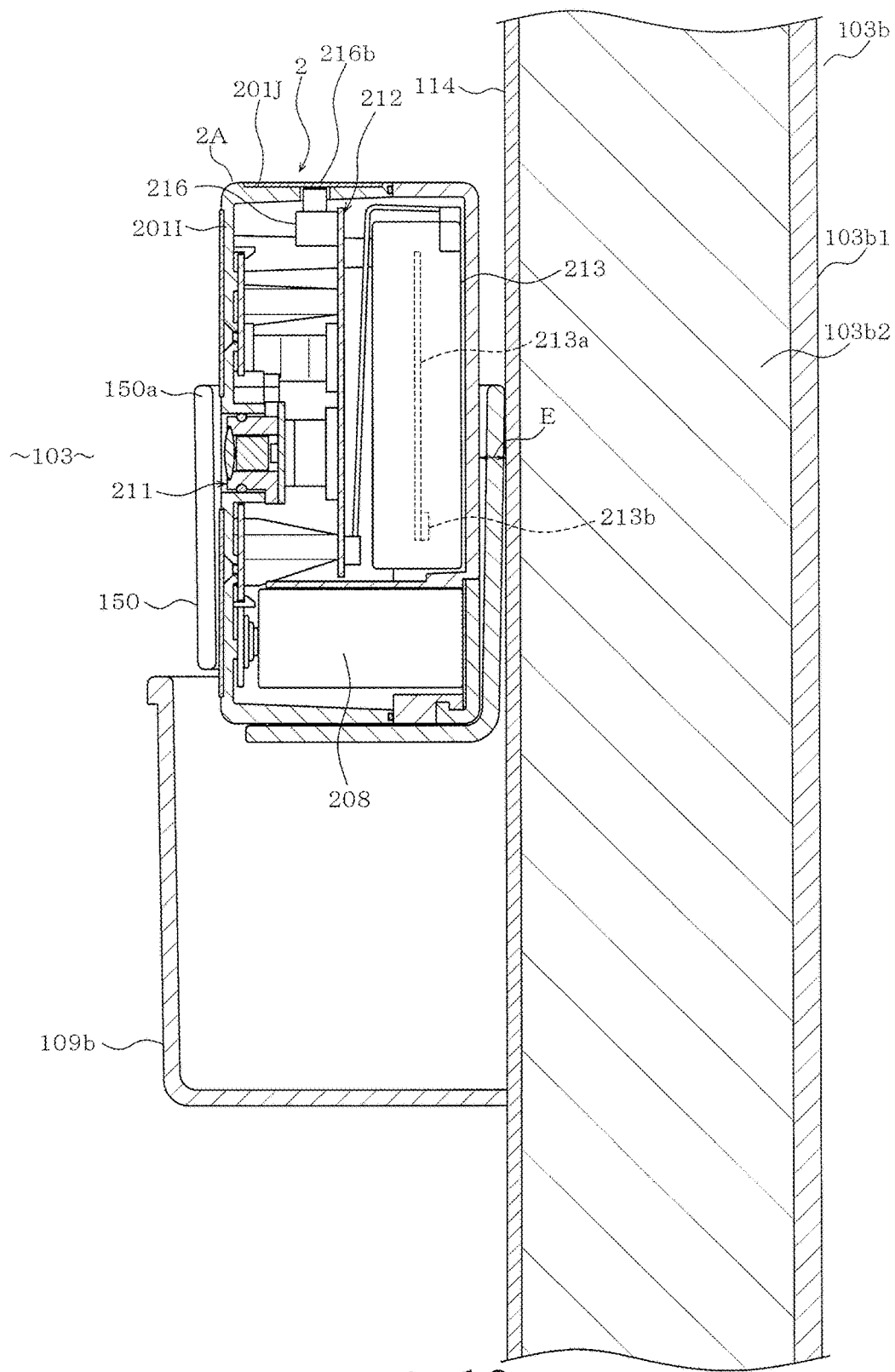
FIG. 12 is a vertical cross-sectional view of a right-side door and a holder case.
Figure 27:
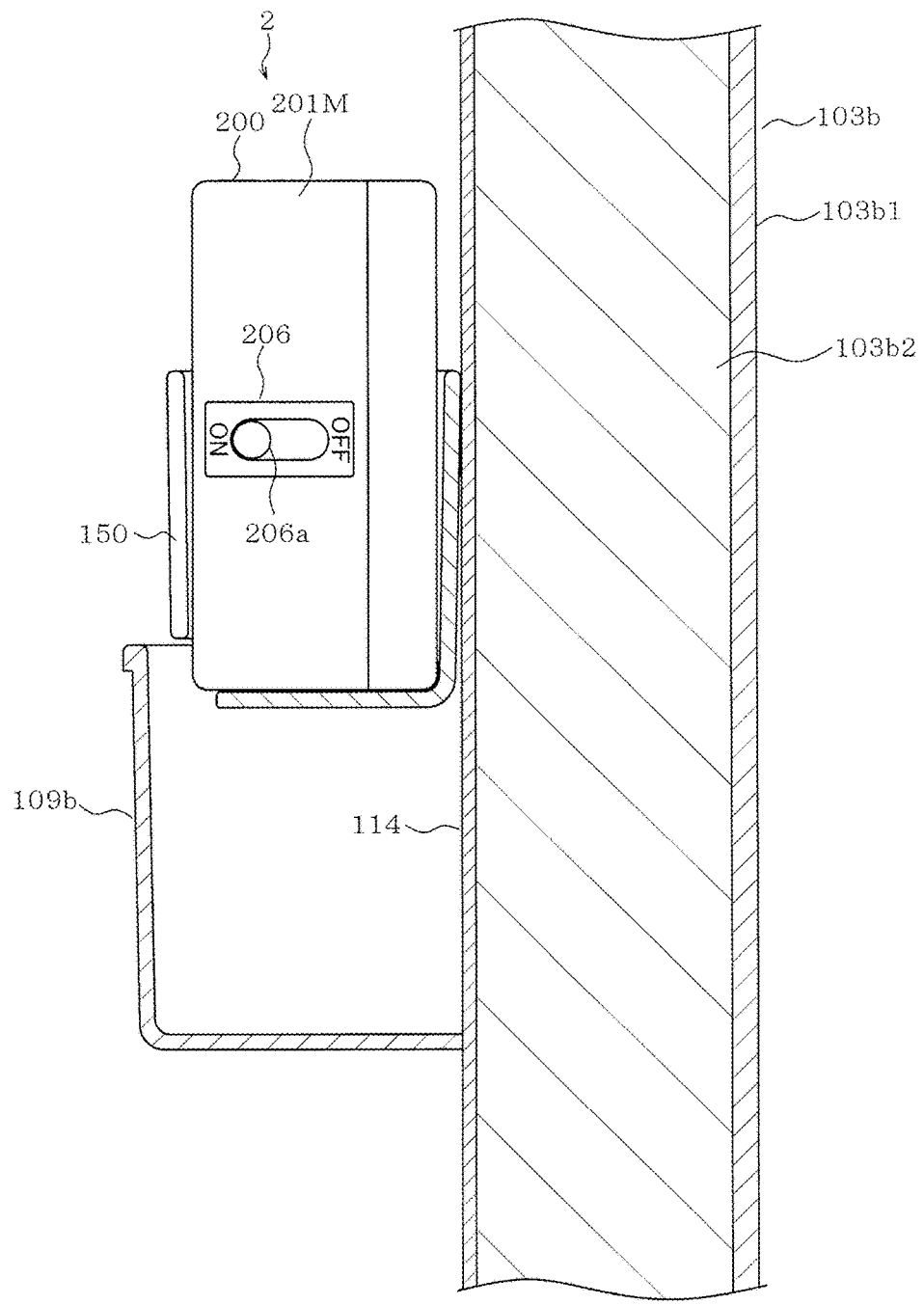

FIG. 27 pertains to another embodiment of a slide switch and corresponds to FIG. 12.

Figure 18:
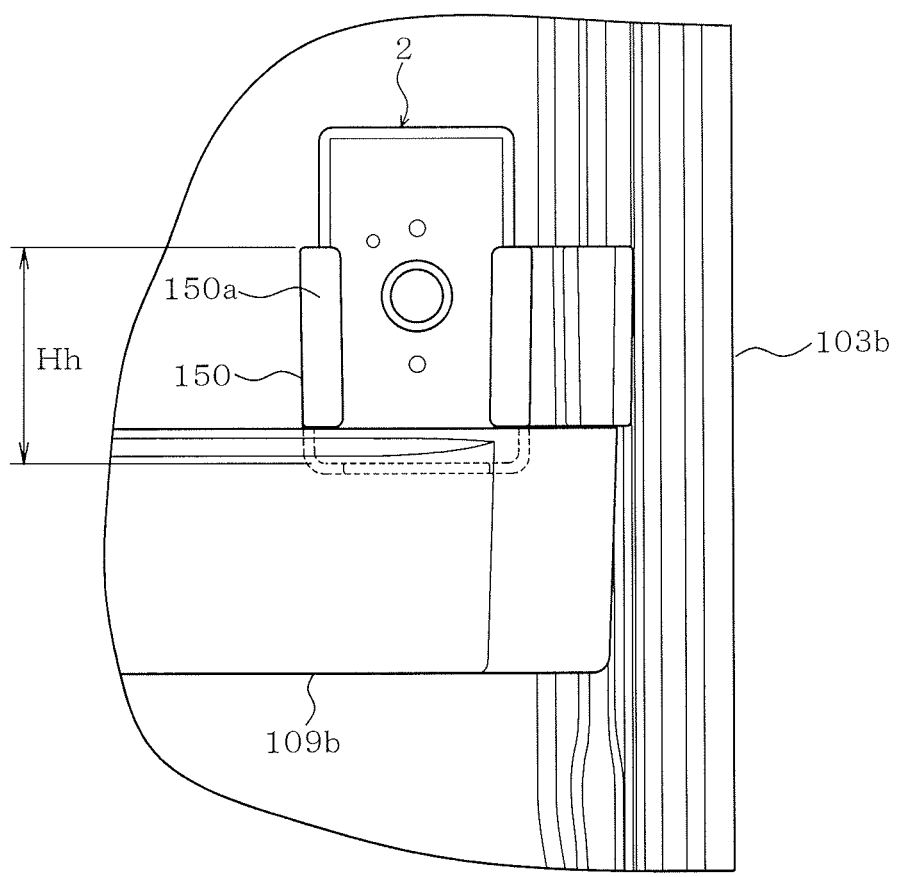
FIG. 18 is a front view of the camera device installed in the holder case.
Figure 28:
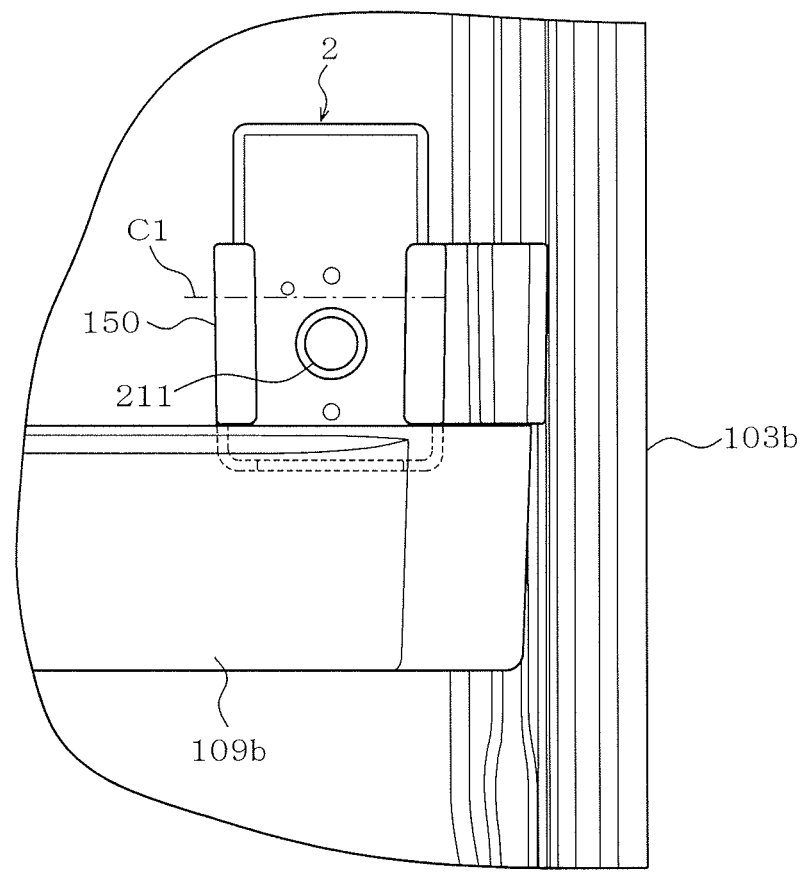

FIG. 28 pertains to a fifth embodiment and corresponds to FIG. 18.

Figure 29:
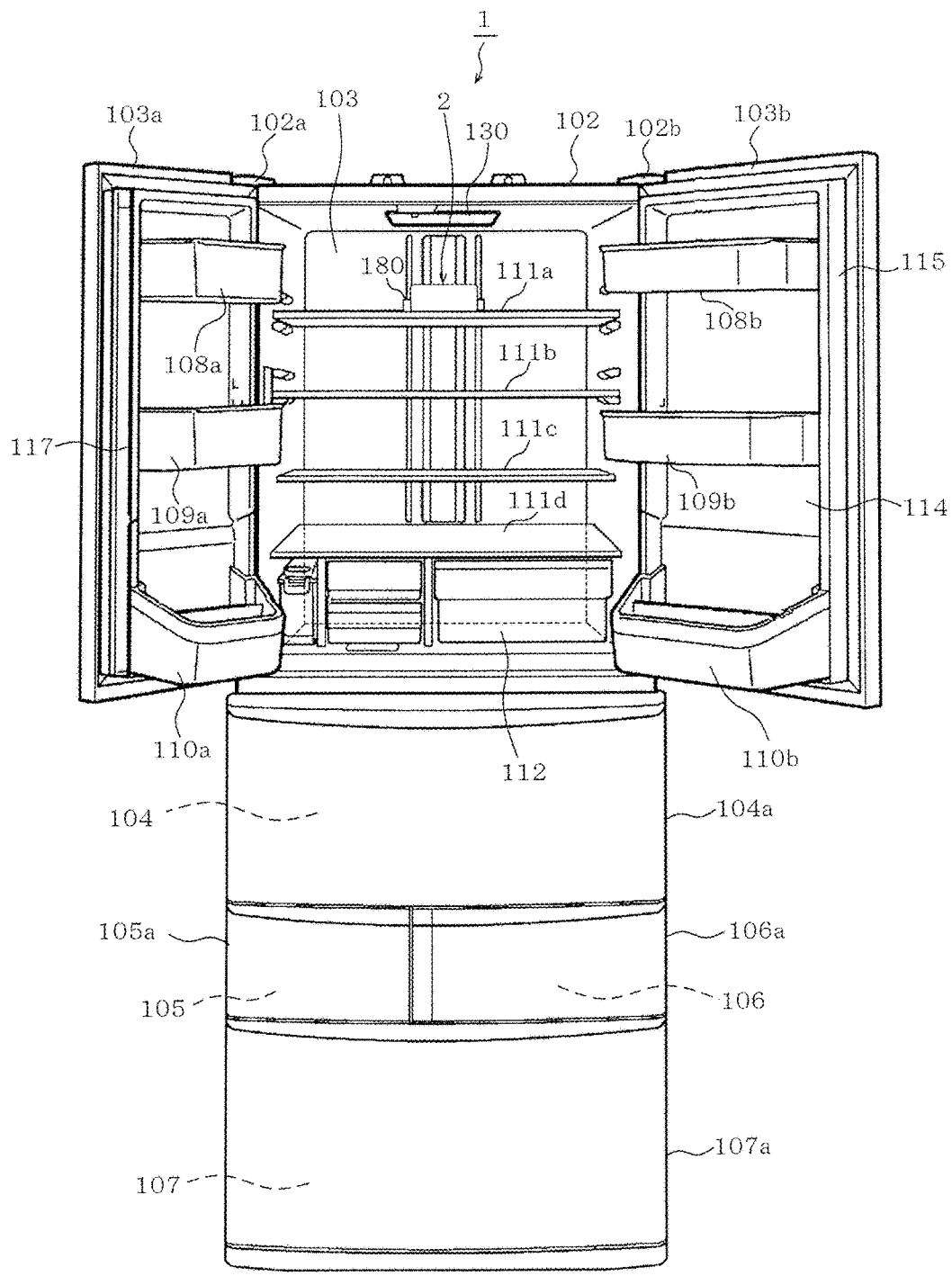
Figure 30:
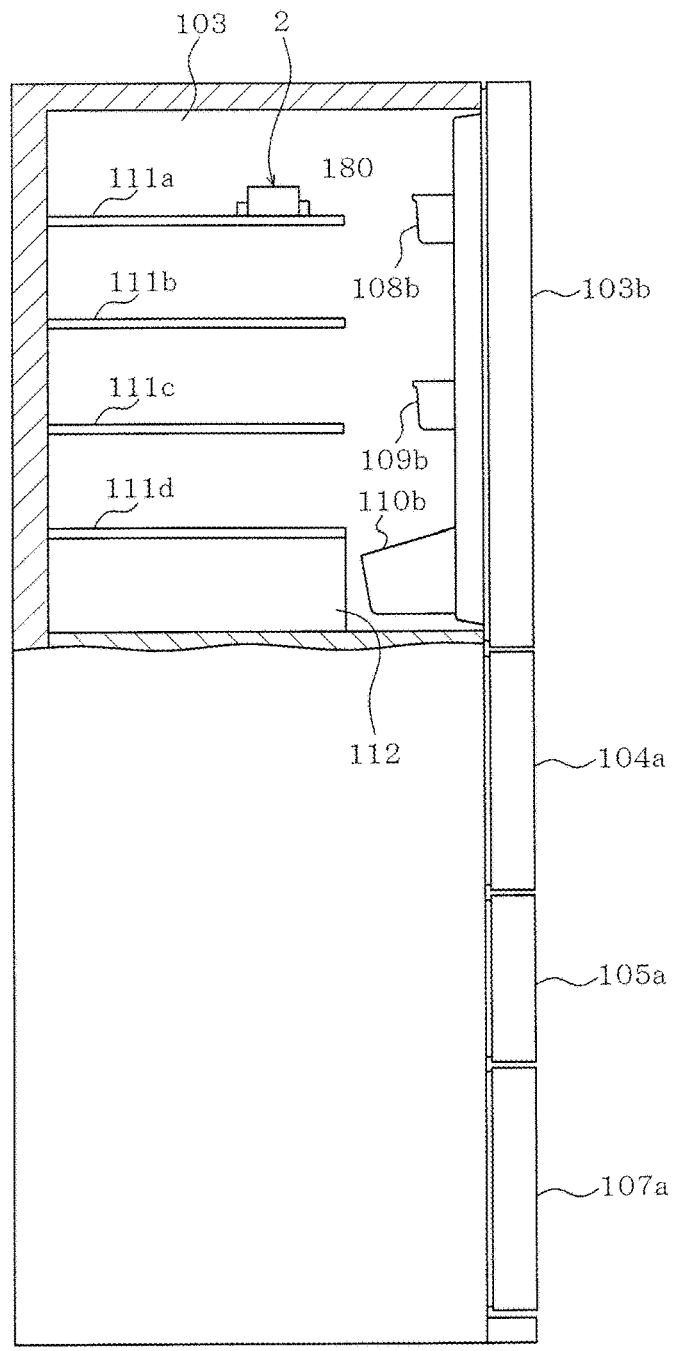

FIG. 29 pertains to sixth embodiment and corresponds to FIG. 11,

FIG. 30 is a cross sectional side view of a refrigeration chamber of the refrigerator.

Figure 31:
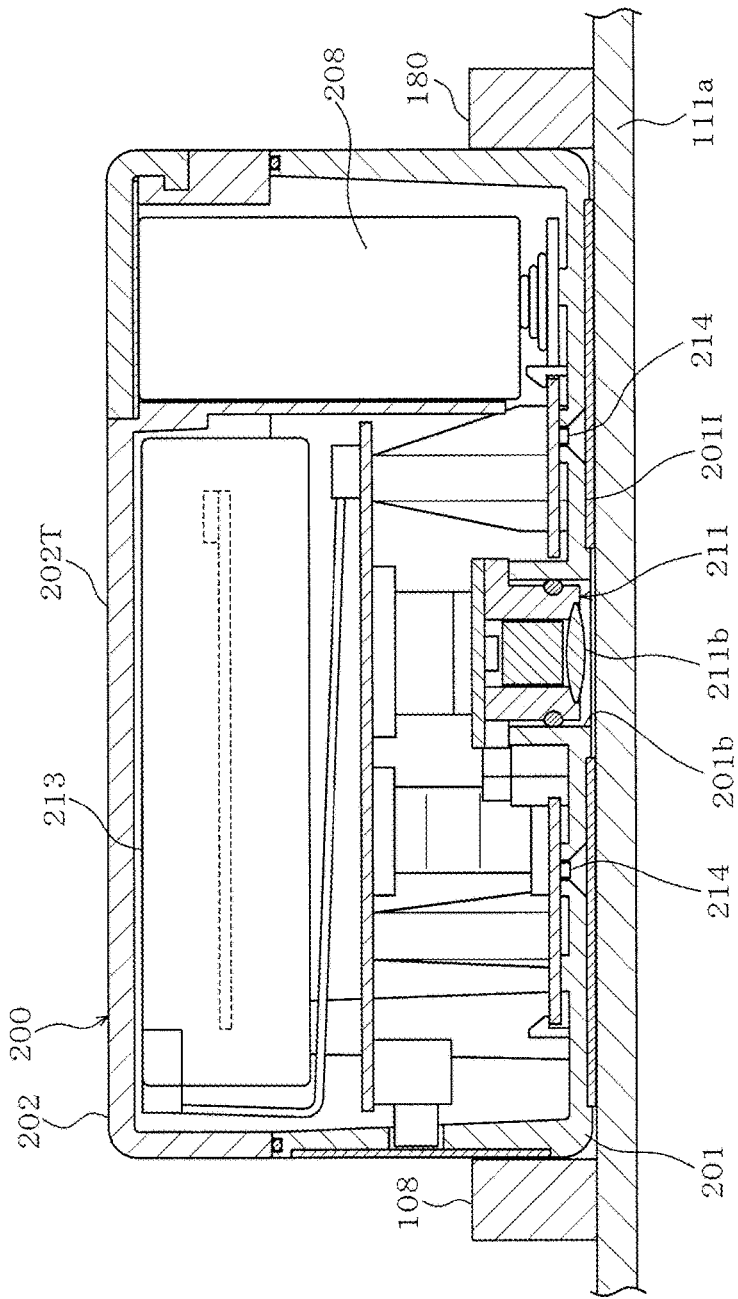

FIG. 31 is a vertical cross-sectional front view of the installed camera device.

Figure 32:
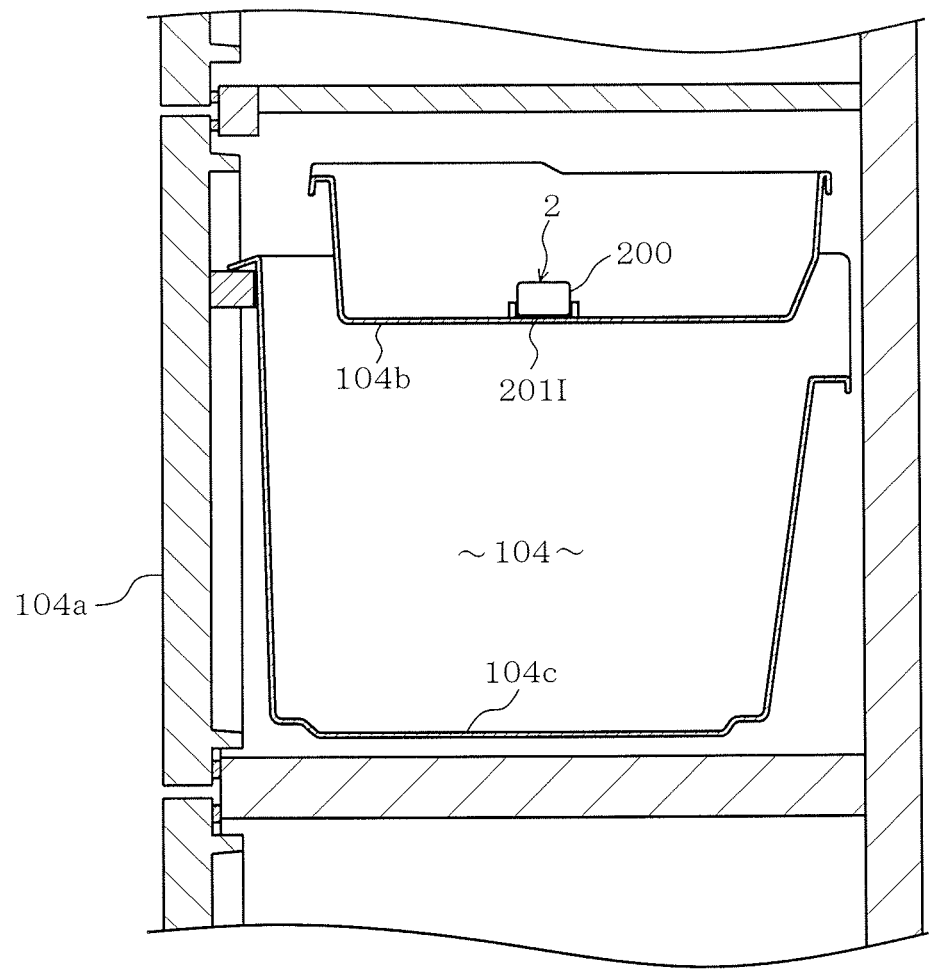

FIG. 32 is a broken vertical cross-sectional front view of the installed camera device.

Figure 33:
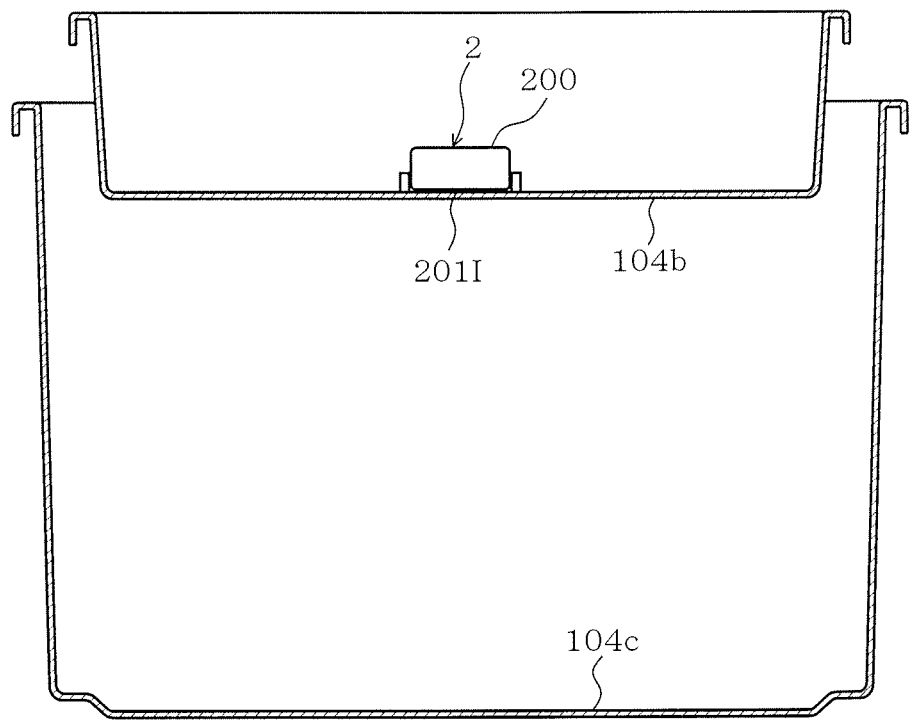

FIG. 33 is a front view of a vegetable container.

Figure 34:
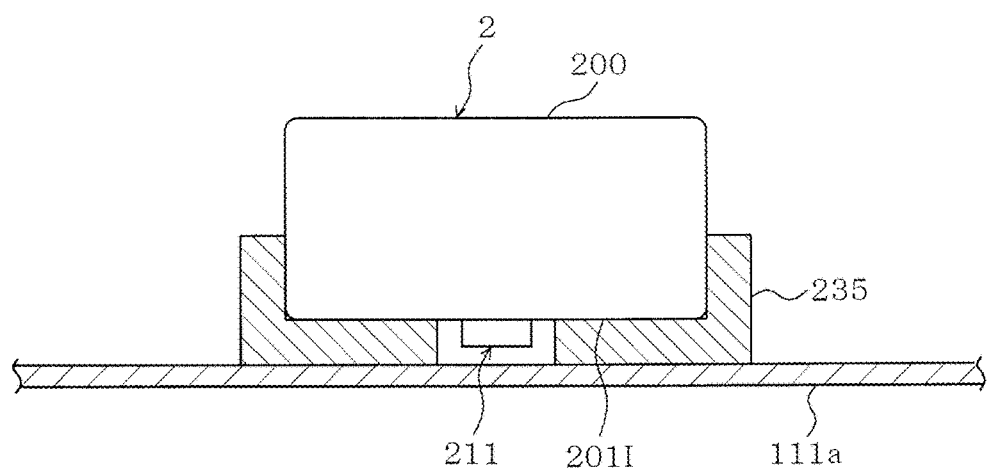

FIG. 34 pertains to an eight embodiment and is a vertical cross sectional front view of the installed camera device.

Figure 35:
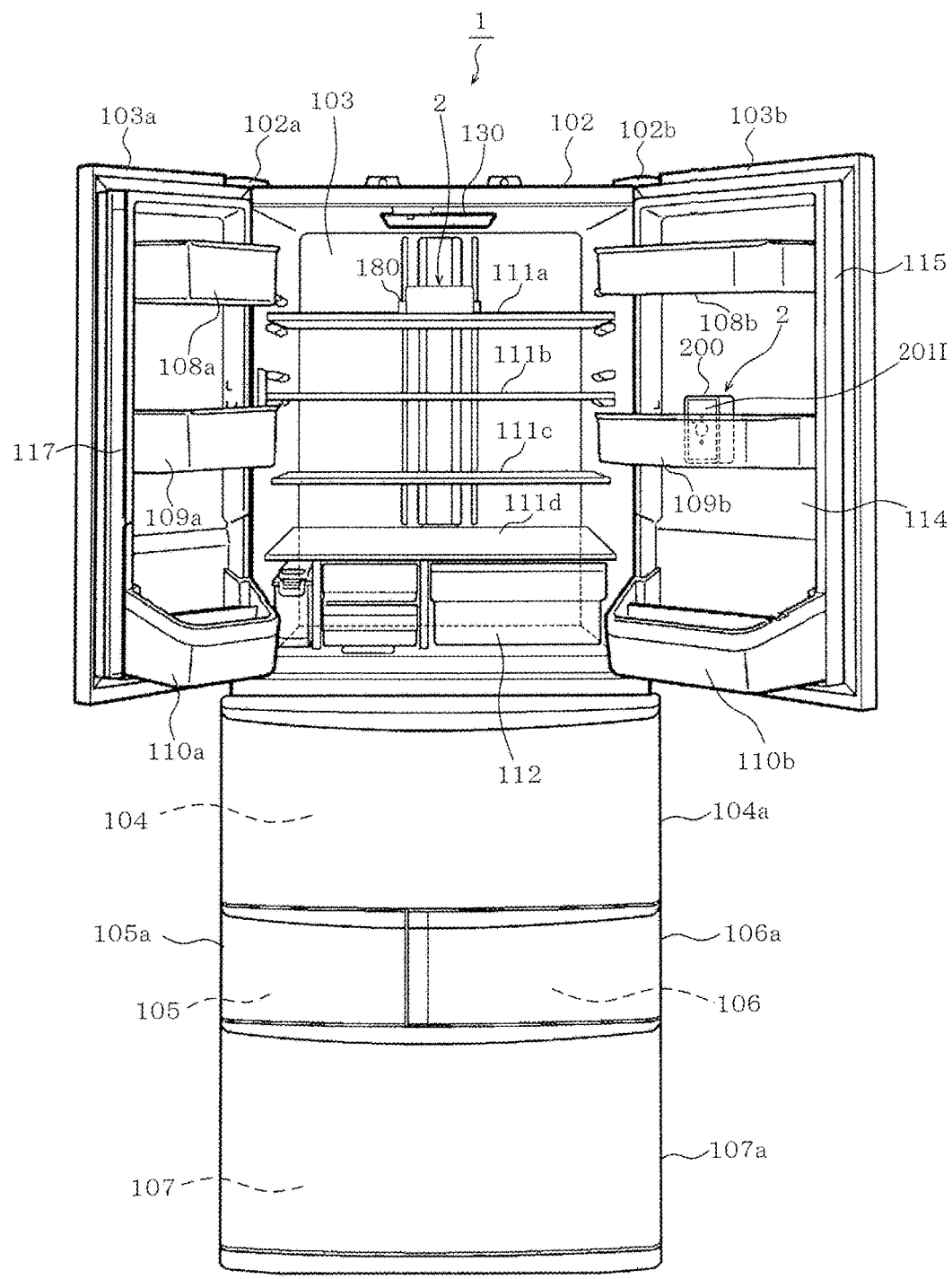

FIG. 35 pertains to a ninth embodiment and corresponds to FIG. 11.

DESCRIPTION

In one embodiment, a camera device for use in a storage unit is provided with a case configured to be installable inside a storage unit; an image capturing element provided inside the case; and an image capture window provided on a first surface portion of the case and configured for capturing image inside the storage unit by the image capturing element. The image capturing element is configured to capture image inside the storage unit where the case is installed.

In one embodiment, a refrigerator is provided with the camera device for use in a storage unit.

Embodiments disclosed herein provide a camera device suitable for practical use in capturing images of the interior of the storage unit and providing a storage unit provided with the same.

First Embodiment

A description will be given on a first embodiment with reference to FIGS. 1 to 21.

Figure 1:
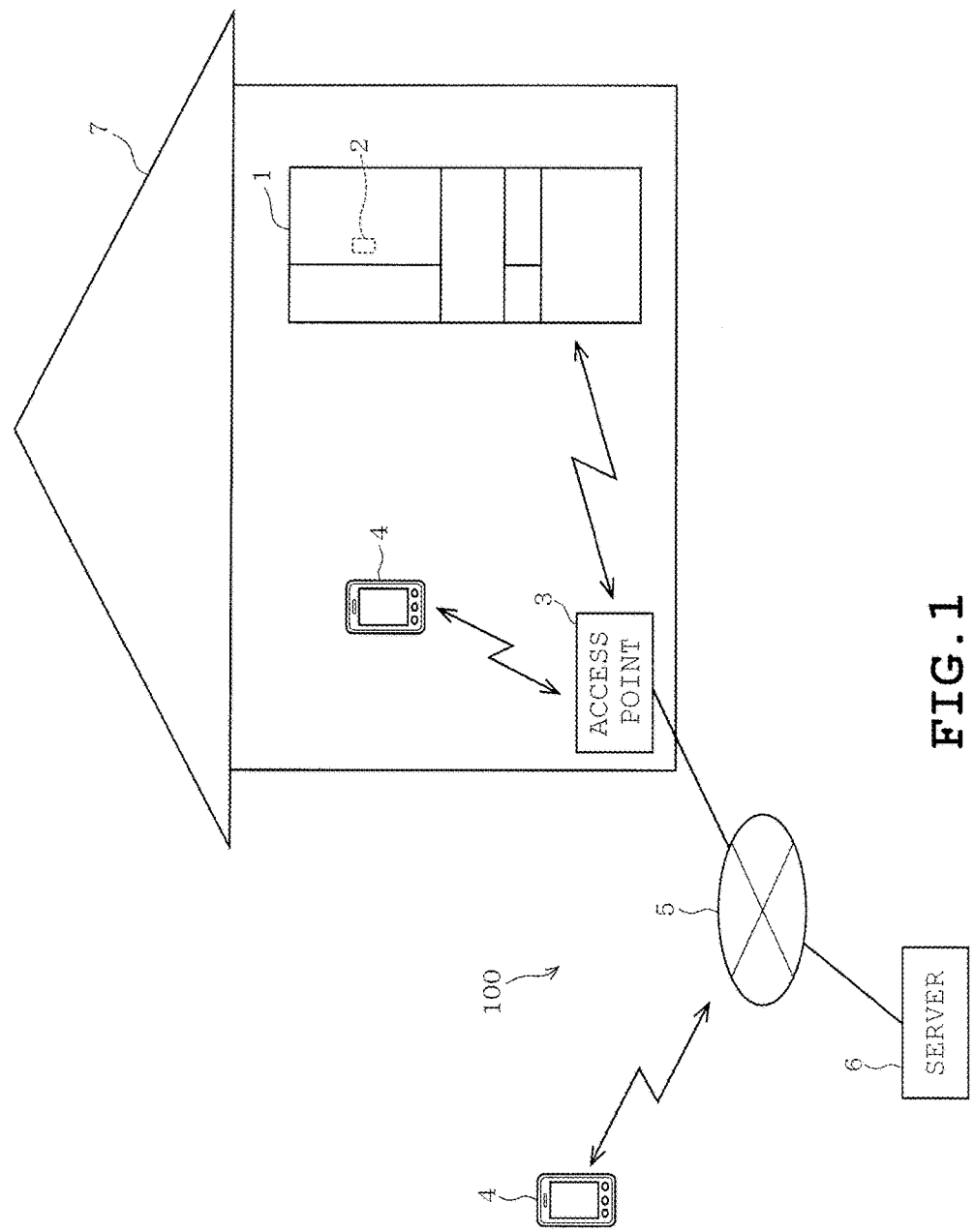
Figure 2:
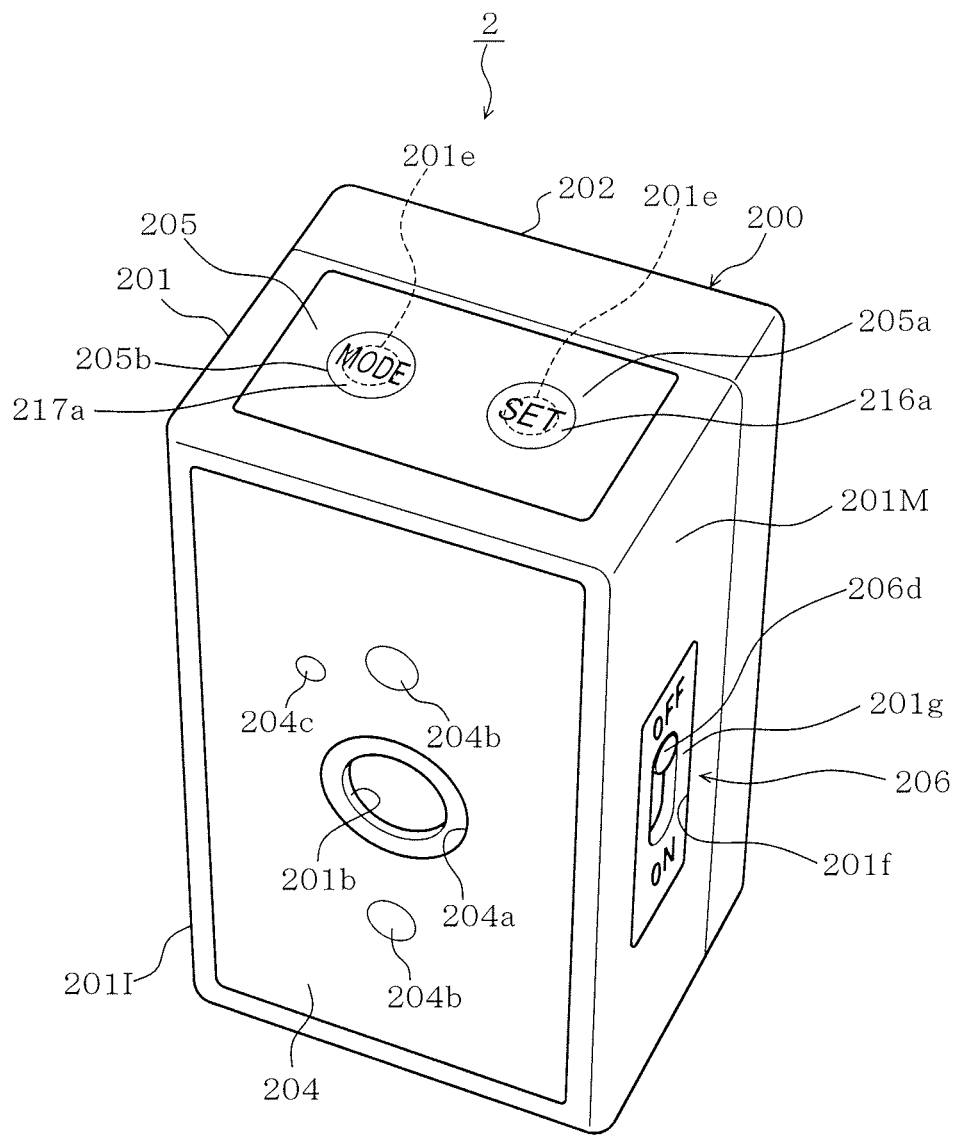
FIG. 2 is a perspective view illustrating the external look of the camera device.

In the first embodiment illustrated in FIG. 1, the camera device 2 serves as a camera device for use in a storage. The camera device 2 is disposed in a refrigerator (storage) 1 which is one example of a home appliance being a component of an in-room image capturing system 100.

First, a description will be given on the in-room image capturing system 100. The in-room image capturing system 100 is configured by the camera device 2 configured to capture images inside the refrigerator 1, an access point 3 for communicating with the refrigerator 1 side, and an operation terminal 4, etc. The access point 3 is connected to an external network (wide area communication network and a mobile phone network) 5 and is configured to communicably interconnect a communication terminal 4 and a server 6, etc. located in remote locations with the refrigerator 1 side byway of the external network 5. In the present embodiment, close range wireless communication such as a Bluetooth (registered trademark) wireless communication is exchanged between the refrigerator 1 and the access point 3; between the access point 3 and the operation terminal 4; and between the camera device 2 and the access point 3.

The operation terminal 4 is used to input image capturing instructions for making the camera device 2 capture in-room images. Examples of operation terminal 4 envisaged in the present embodiment include a tablet PC and a so-called smart phone (highly functional mobile phone). When located inside a residence 7, the operation terminal 4 is connected communicably with the access point 3 through close range wireless communication. When located outside the residence 7, the operation terminal 4 is connected communicably with the access point 3 through wide-range communication by way of the external network 5. The operation terminal 4 is further capable of connecting to the access point by way of the external network 5 through wide-range communication even when located inside of the residence 7. The operation terminal 4 located inside the residence 7 is further capable of communicating directly with the refrigerator 1 side without the intervention of the access point 3

The server 6 is configured by a computer system known in the art. The server 6 stores information (such as an IP address) for accessing the refrigerator 1 side and, in the present embodiment, image data captured by the camera device 2. Though only the refrigerator 1 is illustrated in FIG. 1, other home appliances such as an air conditioner not illustrated are connected to the network.

By interconnecting the home appliances over a network, it is possible to: visualize the electric power consumption of each home appliance for the user's reference; shift the peak of electric power consumption during the day time in summer for example when there is a large demand for electric power; perform control of electric power such as peak cutting in which a momentary use of electric power exceeding the rated level in a general household is inhibited; perform failure diagnosis of home appliances, etc. The network of home appliances provides a user friendly, convenient, and an easy to use system by offering functionalities such as those exemplified above. It is possible to check the status inside the refrigerator 1 (the status of stored items, etc.) by installing the camera device 2 inside the refrigeration chamber for example. By storing the acquired information and captured image data, etc. to the server 6, such information and data, etc. may be viewed even from remote locations by the operation terminal 4 or the like through external network 5, etc.

Next, a description is given on the camera device 2.

As illustrated in FIGS. 2 to 6, the camera device 2 is provided with a case 200 serving as an outer housing. The case 200 is provided with a rectangular body case (first case) 201 and a rectangular lid case (second case) 202. One of the surfaces of the body case 201 is opened. The lid case 202 is relatively shallower than the body case 201 and one of the surfaces of the lid case 202 is similarly opened. Both the body case 201 and the lid case 202 are made of synthetic resin (nonmetal material). The case 200 is formed by joining the opened side of the body case 201 and the opened side of the lid case 202 by screws 200a and is generally shaped like a cuboid. A packing groove 201a is formed on the edge surface of the opening formed on the body case 201. A packing 203 shaped like a frame and serving as a water proof member is fitted into the packing groove 201a. The body case 201 and the lid case 202 are water-tightly joined by the packing 203. The packing 203 comprises a silicone rubber.

Figure 3:
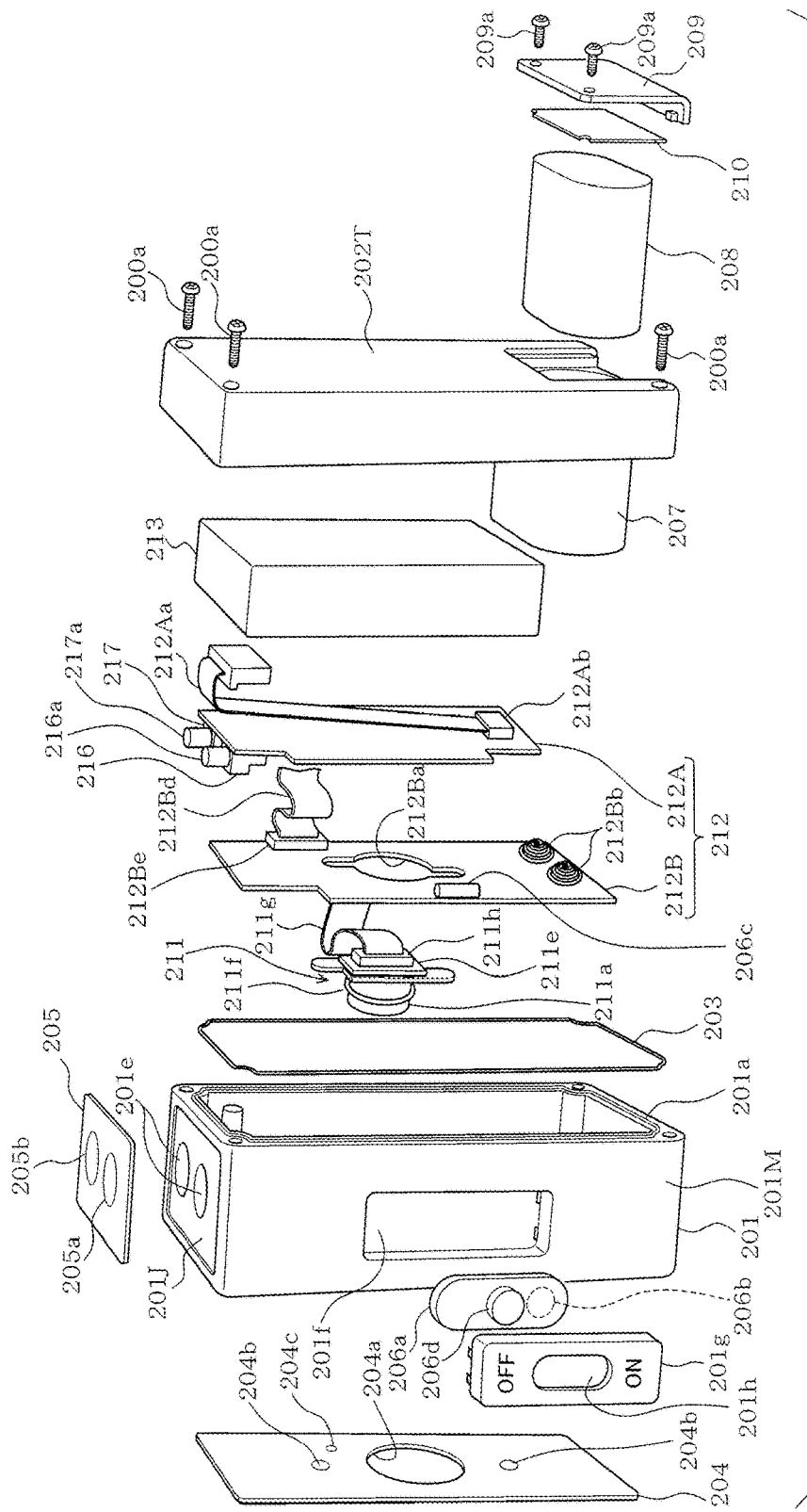
FIG. 3 is a broken perspective view of the camera device.
Figure 4:
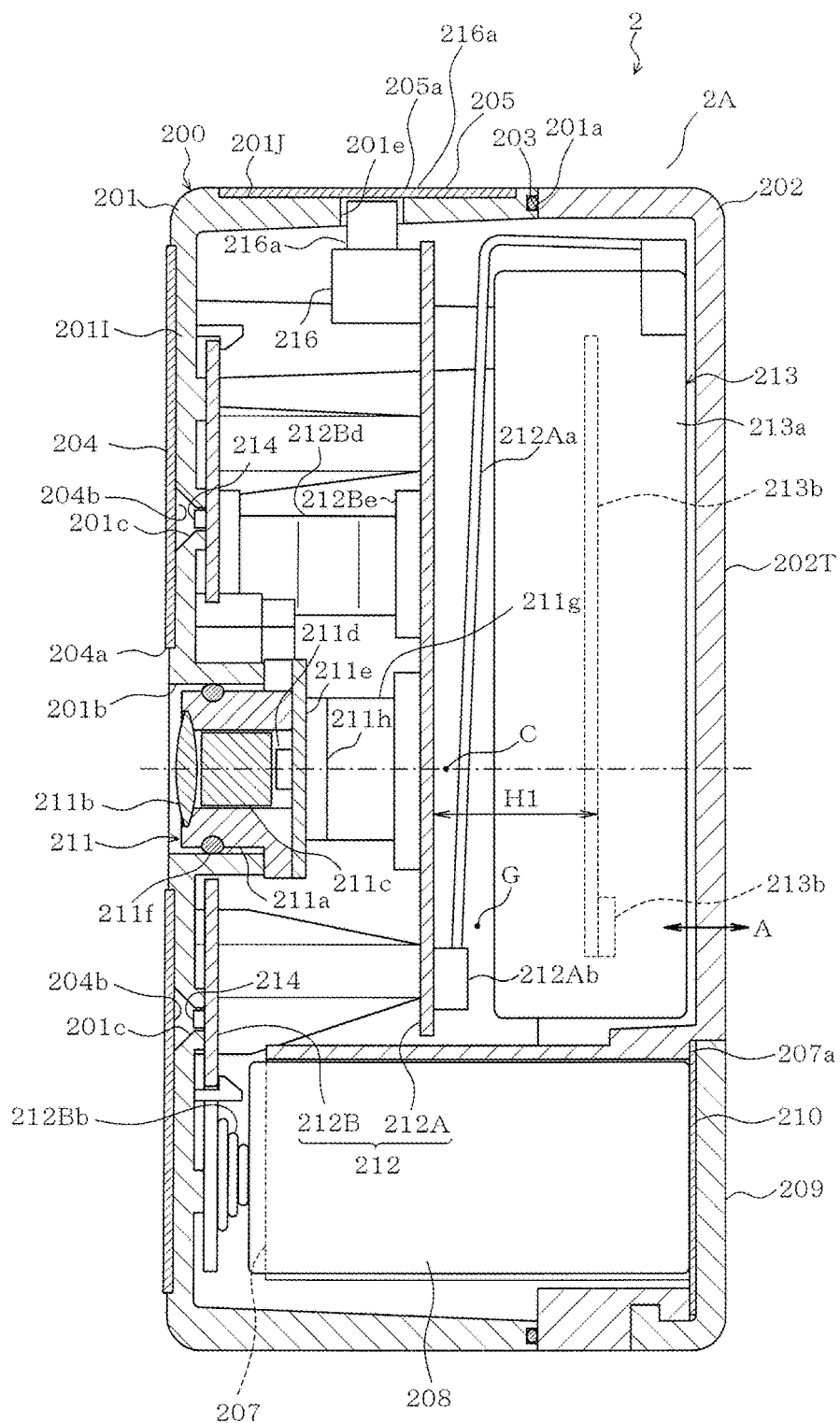
FIG. 4 is a vertical cross-sectional side view of the camera device.
Figure 5:
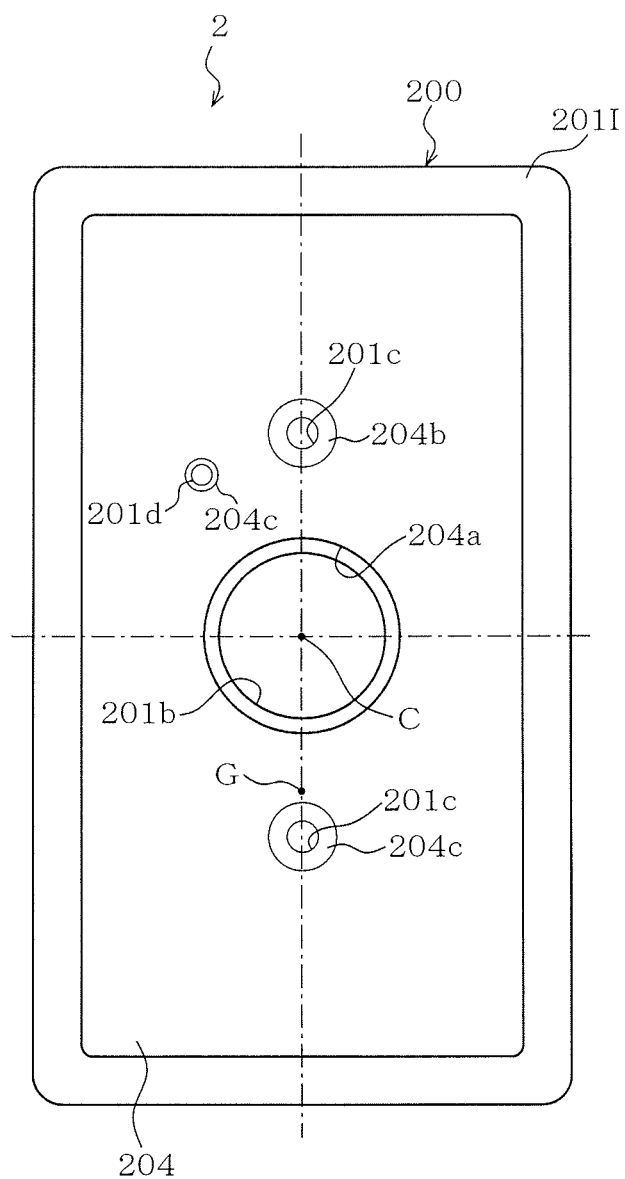
FIG. 5 is a front view of the camera device.
Figure 6:
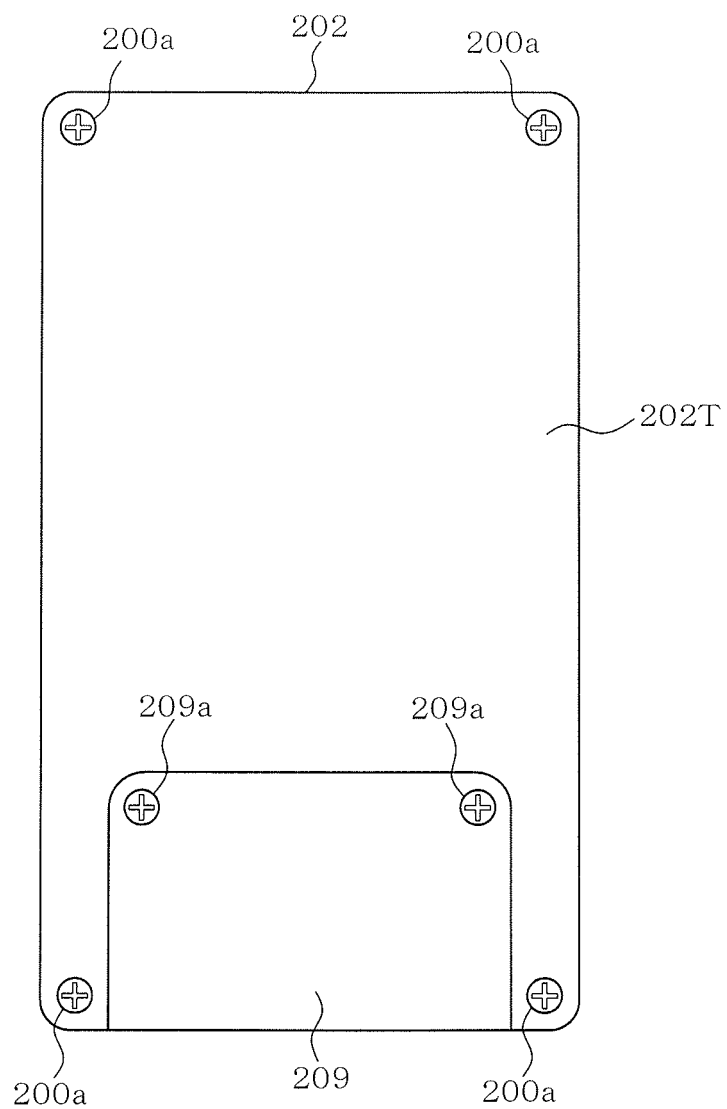
FIG. 6 is a rear view of the camera device.

The surface (the front surface of the camera device 2 being illustrated as the left side surface in FIGS. 3 and 4) located on one side of the body case 201 located in the opposite side of the opening serves as a first surface portion (surface located in the direction of image capturing) 201I. The first surface portion 201I is a flat surface and is provided with a circular image capture window 201b at its center. Upper lighting window 201c and lower lighting window 201c are provided on the upper side and the lower side of the image capture window 201b, respectively so as to be equally spaced from the image capture window 201b. An illuminance sensor window 201d is further formed on the first surface portion 201I.

Figure 7:
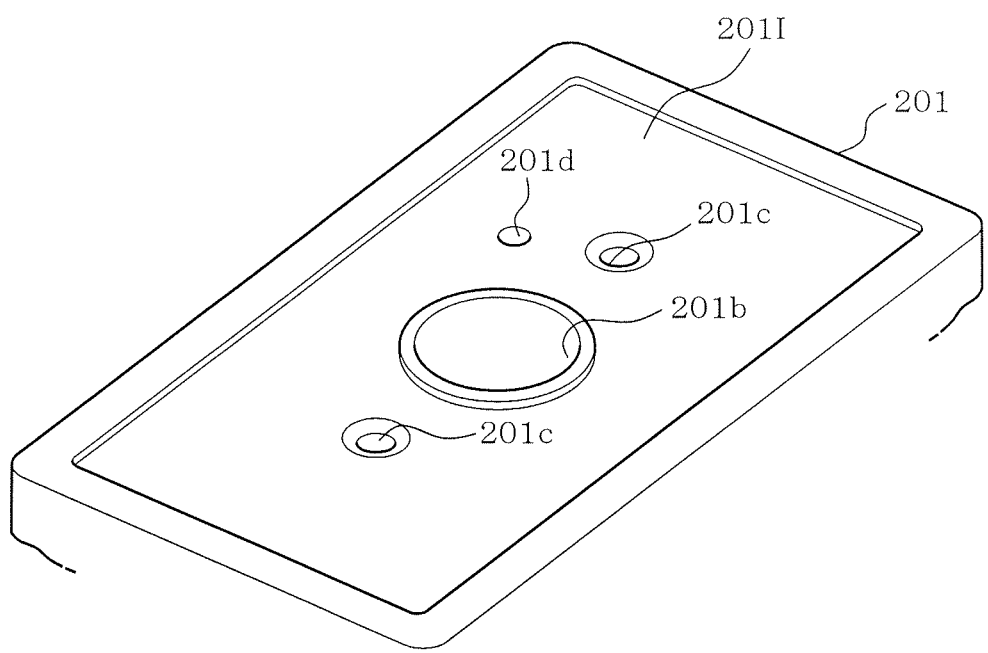
FIG. 7 is a perspective view of the front surface portion of a body case.

As illustrated in FIG. 7, the peripheral edge of the first surface portion 201I and the peripheral edge of the image capture window 201b are slightly projected by the same height.

A sheet of cover member 204 is attached to the first surface portion 201I for covering the same by a double-stick tape not illustrated. A hole 204a is formed through the cover member 204 to prevent the image capture window 201b from being covered. There are no other holes formed on the cover member 204 besides the hole 204a opposing the image capture window 201b. The image capture window 201b faces the outside of the cover member 204 through the hole 204a, meaning that the image capture window 201b is not covered. The cover member 204 is made of a transparent material. A design (not illustrated) is printed on one side of the cover member 204 being bonded on the underlying surface. The design is not printed on the portions corresponding to the lighting windows 201c and the illuminance sensor window 201d. Instead, transparent portions 204b and 204c are formed on these portions.

Switch through holes 201e are formed on an upper surface portion 201J of the body case 201. A sheet of switch cover 205 is bonded to the upper surface portion 201J by a double-stick tape not illustrated. The switch through holes 201e are covered by the switch cover 205. Designs 205a and 205b are printed on one side of the switch cover 205 being bonded on the underlying surface. The designs 205a and 205b are located with the switch through holes 201e and thus, the double-stick tape is not applied to these portions. The switch cover 205 is configured to be flexible at portions where the designs 205a and 205b are printed to provide a feel of operating the switches.

Figure 8:
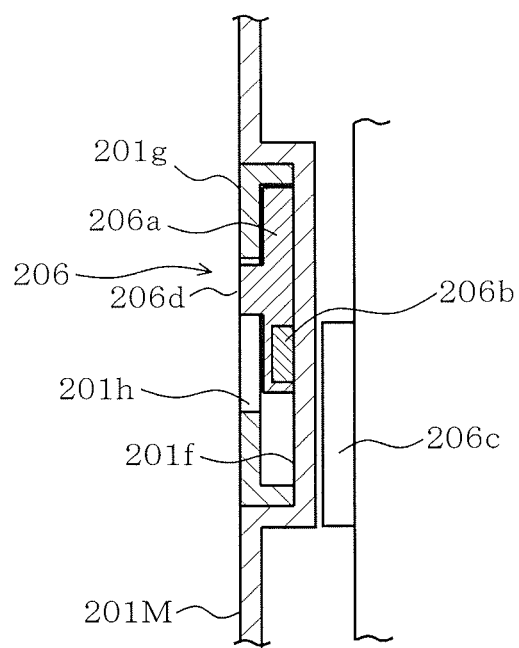
FIG. 8 is a vertical cross-sectional view of a slid switch.

As illustrated in FIG. 8, a shallow elongate recess 201f is formed on the right-side wall 201M of the body case 201. The recess 201f is used to store an operator for a reed switch 206c located near the inner surface of the right-side wall 201M as later described. A slide cover 201g is engaged to the recess 201f to create a space for providing the operator of the reed switch 206c. A long hole 201h is formed on the slide cover 201g. An operator 206a is disposed movably in the up and down direction for example in the space between the recess 201f and the slide cover 201g. The operator 206b is provided with a magnet 206b. The operator 206a is further provided with a protruding knob 206d being located within the long hole 201h. The slide switch 206 is configured by the operator 206a, the magnet 206d, and the reed switch 206c later described. The slide switch 206 corresponds to a power switch for turning the power on and off. The reed switch 206c is turned on when the operator 26a is operated in the downward direction. As a result, the slide switch 206 is turned on to turn on the power. A label reading "ON" is provided on the lower portion of the slide cover 201g and a label reading "OFF" is provided on the upper portion of the slide cover 201g.

The lid case 202, on the other hand, is provided with a battery storage 207 projecting toward the body case 201. On one end (the rear end) of the battery storage 207, an opening 207a is provided for taking the battery in and out. Battery 208 is inserted in place through the opening 207a. The battery 208a is a lithium battery and is a primary battery. The opening 207a of the battery storage 207 is opened and closed by a battery lid (lid) 209. The lower edge of the battery lid 209 is engaged with the lower portion of an outer opening, whereas the upper portion of the battery lid 209 is screw fastened above the edge of the opening 207a.

The battery 208 provides power to the camera device 2. The camera device 2, being free of power plug cable, etc., may be installed in any location inside the refrigerator 1. A water proof element comprising a silicone rubber and serving as a water proof element is provided between the opening 207a of the battery storage 207 and the battery lid 209. An image capturing portion 211, a substrate 121, and a communication module 213 are provided inside the case 200 so as to be located above the battery 208. The image capturing portion 211 corresponds to an image capturing element and the communication module 213 corresponds to a communication element.

The image capturing portion 211 is provided with a lens holder 211a serving as an exterior housing, an outer lens 211b corresponding to a lens, a lens assembly 211c, an image sensing device 211d, and a substrate 211e. The outer lens 211b and the lens assembly 211c contain a wide-angle lens. The wide-angle lens provides a view angle of approximately 120 degrees. For comparison, a generally available web camera provides a view angle of approximately 55 degrees.

The shape of the lens holder 211a is generally circular. The outer lens 211b and the lens assembly 211c are held by the lens holder 211a. The image sensing device 211d such as a CCD and CMOS is implemented on the substrate 211e. The substrate 211e is mounted on the rear end portion (the right end portion as viewed in FIG. 4) of the lens holder 211a.

The lens holder 211a is fitted to the image capture window 201b. An O ring 211f is provided at the fitting portion. The O ring 211f corresponds to a water proof element. As illustrated in FIG. 4, the outermost surface of the image capturing portion 211 (the outermost surface of the outer lens 211b) is located in a position retracted from the outer surface of (the outer surface of the peripheral edge of the image capture window 201b) of the first surface portion 201I of the case 200. A connecting terminal 211h configured to establish connection with one end of a flexible cable 211g is implemented on the substrate 211e. The flexible cable 211g connects the substrate 211e and a main substrate 212A later described.

A substrate 212 is configured by a main substrate 212A and an auxiliary substrate 212B. The auxiliary substrate 212B is provided with a hole 212Ba for avoiding the image capturing portion 211. The auxiliary substrate 212B is attached to the rear side of the first surface portion 201I of the case 200 by way of a rib so as to be distanced from the inner surface of the first surface portion 201I. The substrate 211e and the flexible cable 211g are located behind the auxiliary substrate 212B.

Figure 9:
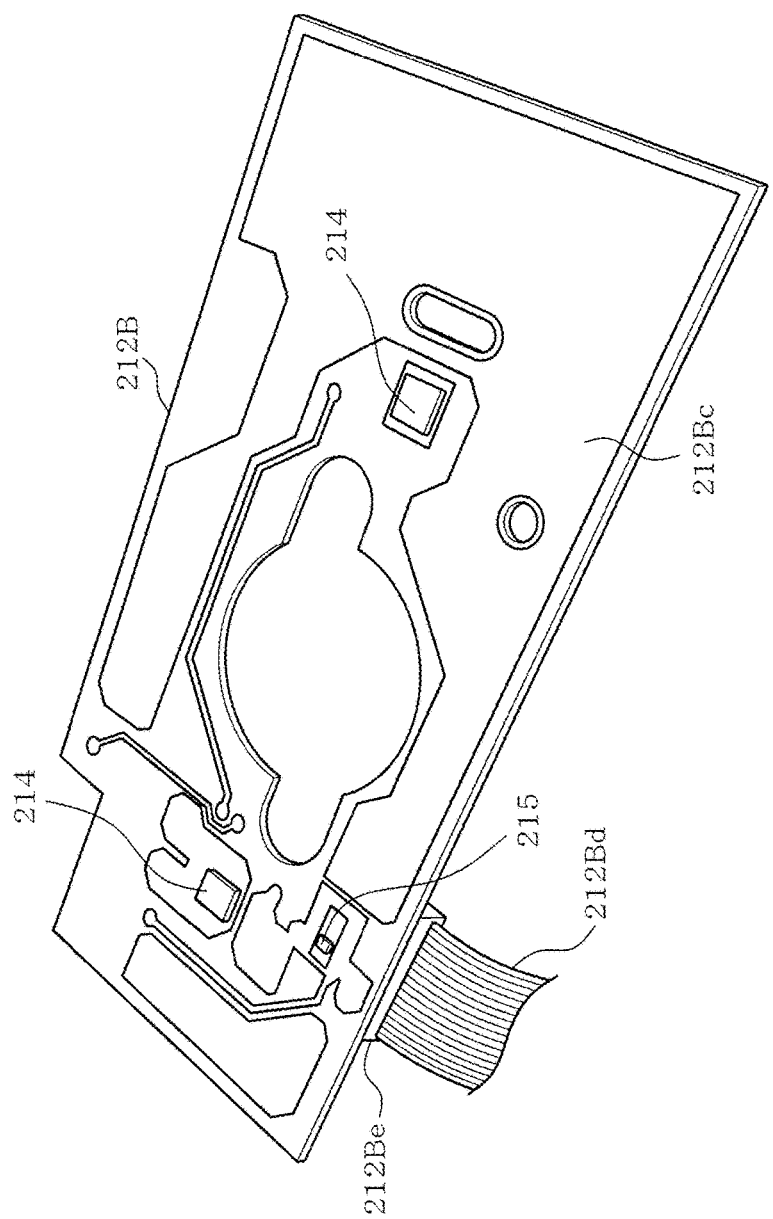
FIG. 9 is a perspective view of an auxiliary substrate.

Battery connection terminals 212Bb are provided on the lower rear surface of the auxiliary substrate 212B. The plus terminal and the minus terminal of the battery 208 are connected to battery connection terminals 212Bb. As illustrated in FIGS. 4 and 9, image capturing lightings 214 corresponding to an image capture lighting element and illuminance sensor 215 are implemented on the front surface portion of the auxiliary substrate 212B. The image capturing lightings 214 being implemented on the auxiliary substrate 212B face or fit into the lighting windows 201c. The illuminance sensor 215 faces the illuminance sensor window 201d.

The reed switch 206c is implemented on the edge of the rear surface of the auxiliary substrate 212B. As illustrated in FIG. 8, the reed switch 206c is located near the inner surface of the right-side wall 201M corresponding to the first wall. Reed switch 206c and the operator 206a are isolated by the wall of the recess 201f provided on the right-side wall 201M. This structure serves as a water proof element.

Metal circuit pattern (not illustrated) for establishing connection with multiple electronic components are formed on the main substrate 212FA and the auxiliary substrate 212B. As illustrated in FIG. 9, a ground pattern 212Bc, being a metal pattern, is formed substantially throughout the front surface of the auxiliary substrate 212B. The ground pattern 212Bc functions as an electric shield for blocking noise originating from elements outside the case 200.

A connection terminal 212Be for connecting the flexible cable 212Bd is further implemented on the auxiliary substrate 212B. The flexible cable 212Bd is connected to the auxiliary substrate 212B and the main substrate 212A.

The main substrate 212A is located behind the auxiliary substrate 212B and screw fastened to the body case 201. A camera side controller 220 (later described) comprising a microcomputer, etc. is implemented on the main substrate 212A. The camera side controller 20 is responsible for performing the overall control of the camera device 2. Switches comprising setting switch 216 and mode switch 217 are implemented on the upper portion of the main substrate 212A. The setting switch 216 is configured to start the setting, validate the setting, and end the setting. The mode switch 217 is configured to specify or select various modes. The setting switch 216 and the mode switch 217 comprise a tactile switch (push switch) and are provided with an operator 216a and an operator 217a respectively. Switches 216 and 217 effect a switching operation when the operators 216a and 217a are depressed downward and return to their original positions after operation. As illustrated in FIG. 4, the operators 216a and 217a are disposed within the switch holes 201e. The printed designs 205a and 205b of the switch cover 205, when depressed, deform flexibly to depress the operators 216a and 217a. The printed designs 205a and 205b serve as operating portions 216b and 217b of the setting switch 216 and the mode switch 217 (constitute a part of the setting switch 216 and the mode switch 217).

An acceleration sensor 218 and a temperature sensor 219 (see FIG. 10) are further implemented on the main substrate 212A. The acceleration sensor 218 is configured to detect the positioning of the camera device 2 being installed (vertical orientation, lateral orientation, the first surface portion 201I facing downward and the first surface portion 201I facing upward).

The temperature sensor 219 is configured to detect the temperature of the location where the camera device 2 is installed. A judgement is made that the camera device 2 is installed in the refrigeration chamber when the temperature detected by the temperature sensor 219 belongs to the temperature zone of the refrigeration chamber. A judgement is made that the camera device 2 is installed in the freezer chamber when the temperature detected by the temperature sensor 219 belongs to the temperature zone of the freezer chamber. When the camera device 2 has been judged to be installed to the freezer chamber, such judgement is transmitted to the refrigerator 1 side and informed to the user through the control panel 22, etc. of the refrigerator 1 since there is a risk of failures, etc.

A connection terminal 212Ab for connecting the flexible cable 212Aa is further implemented on the main substrate 212A. The flexible cable 212Aa connects the main substrate 212A with the communication module 213. The communication module 213 provided inside the case 200 is screw fastened to the body case 201 in a position further rearward relative to the substrate 212. A module substrate 213b, etc. having circuitry for communication control is provided inside the module case 213a of the communication module 213. Antenna 213c is patterned onto the module substrate 213b. The antenna 213c is provided on a surface 202T located on the opposite side of the first surface portion 201I.

The communication module 213 is configured to transmit the image data of the interior of the storage captured by the image capturing portion 211 to the operation terminal 4, the server 6, or the like through the access point 3. The captured image data is transmitted to the server 6 for storing it in the server 6. Examples of image information include data (still image, moving image) of known formats such as a bit map format and JPEG/MPEG format and compressed/encrypted forms of such data as well as converted forms of such data converted by image processing. The image data may come in any format as long as such data can be transmitted to the server 6 and can be viewed through the operation terminal The image capturing portion 211, the substrate 212, the communication module 213, and the battery 208 of the camera device 2 are configured as a unit (an integrated structure) 2A. The battery 208 is provided in a location which does not cover the communication module 213. In other words, the battery 208 is provided in a location which does not block the route for the antenna 213c to transmit and receive information (the direction indicated by arrow A) in good condition.

Distance H1 (see FIG. 4) between the antenna 213c of the communication module 213 and the substrate 212 is configured to be equal to or less than ½ of the wavelength λ of wireless radio waves such as 10 mm. For example, when the frequency of the wireless radio wave is 2.5 GHz, the wave length λ is approximately 120 mm and thus, the distance H1 is specified to ½ (60 mm) of the wave length λ.

As illustrated in FIG. 4, battery 208 having a large mass is disposed in the lower portion of the case 200 of the camera device 2. Thus, the center of gravity G of the camera device 2 is arranged to be located in a position different from the center (volume center) C of the case 200, which, in this case, is below the volume center C.

Operating portions 216b and 217b (preventing element) constituting apart of the setting switch 216 and the mode switch 217 are provided on the outer surface of upper wall 201J of the case 200 located in the opposite side of the battery 208.

An electric configuration of the camera device 2 will be described herein with reference to FIG. 10. The camera side controller 220 is configured by a microcomputer provided to the main substrate 212A. The camera side controller 220 executes the overall control of the camera device 2 and is provided with components such as a CPU 220a, a ROM 220b, a RAM 220c, a time keeper 220d, and a nonvolatile memory 220e serving as an information storing element. More specifically, examples of the controls executed by the camera side controller 220 include a control of the timing of image capturing by the image capturing portion 211; a control for preparing the image capturing environment for capturing images (controlling illumination of image capturing lighting 214); transmitting captured image data by the communication module 213; and a control for receiving (accepting) image capturing instructions later described from the illuminance sensor 215. In the present embodiment, the camera side controller 220 also executes image processing such as modifying the captured image.

The time keeper 220d is configured by a real time clock module having a time keeping and calendar function capable of keeping track of real time (time, day and month, and day of the week).

The illuminance sensor 215 connected to the camera side controller 220 comprises an illuminance sensor and is configured to detect the illuminance around the camera device 2. More specifically, the illuminance sensor 215 is configured to detect an optical energy of a prescribed wave length band (In the present embodiment, optical energy emitted from later described in-room lighting 130 and 132). The optical energy detected by the illuminance sensor 215 is converted into an electric signal and displayed to the camera side controller 220.

In the present embodiment, the final form of signal of image capturing instructions given by the user is optical energy emitted according to a prescribed pattern (flickering of the later described in-room lightings 130 and 132 according to a prescribed pattern). The camera side controller 220 judges an issuance of image capturing instructions when flickering of the prescribed pattern is detected by the illuminance sensor 215.

The camera device 2 is used with the slide switch 206 turned ON (power turned ON) and normally stands by in a low power mode (sleep control mode) consuming relative less electric power compared to the normal operation mode. When receiving image capturing instructions, the camera device 2 returns to the normal operation mode and captures image of the interior of the storage. As illustrated in FIG. 11, the refrigerator 1 to which the camera device 2 is provided, in the listed sequence from the upper side of the body 102, with a refrigeration chamber 103 serving as storage chamber configured to store food, a vegetable chamber 104, an ice maker 105, an upper freezer 106, and a lower freezer 107. The compartment of the refrigeration chamber portion 103 and the vegetable chamber 104 and the compartment of the ice maker 105 and the upper freezer 106 are divided by a thermally insulative partition not illustrated. The refrigeration chamber 103 is opened and closed by a left-side door 103a and a right-side door 103b configured as a double door (revolving door) rotatably supported by hinges 102a and 102b.

The vegetable chamber 104, the ice maker 105, and the upper and lower freezers 106 and 107 are opened and closed by drawer type doors 104a, 105a, 106a, and 107a, respectively. The length of the right-side door 103b (the length from the rotational center to the opening end) is configured to be greater than the length of the left-side door 103a.

A door sensor 124 (see FIG. 10) is provided on each of the doors for detecting their opened or closed status. The configuration of the refrigerator 1 illustrated in FIG. 11 is merely an example. Thus, the layout of the storage chambers is variable. For example, the upper freezer 106 may be a switchover chamber in which refrigeration and freezing functions may be switched.

The left-side door 103a of the refrigeration chamber 103 is provided with a door pocket 108a, a door pocket 109a, and a door pocket 110a in the listed sequence from the upper side. The right-side door 103b of the refrigeration chamber 103 is provided with a door pocket 108b, a door pocket 109b, and a door pocket 110b in the listed sequence from the upper side. Multiple shelves 111, made of transparent material such as glass, are provided inside the refrigeration chamber 103. A special purpose chamber 112 such as an egg storing chamber and a chiller chamber is provided in the lower most level. In-room lightings 130 and 132 (See FIG. 10) serving as a lighting element are provided inside the refrigeration chamber 103. The in-room lighting 130 is provided on the ceiling and the in-room lighting 132, though not illustrated, is provided on the side surface though not illustrated in FIG. 11. The in-room lighting 130 and the in-room lighting 132 are provided to illuminate specific portions of the fridge interior. For example, the in-room lighting 130 illuminates the upper portion of the fridge interior, whereas the in-room lighting 132 illuminates the central portion and the lower portion, etc. of the fridge interior.

Figure 13:
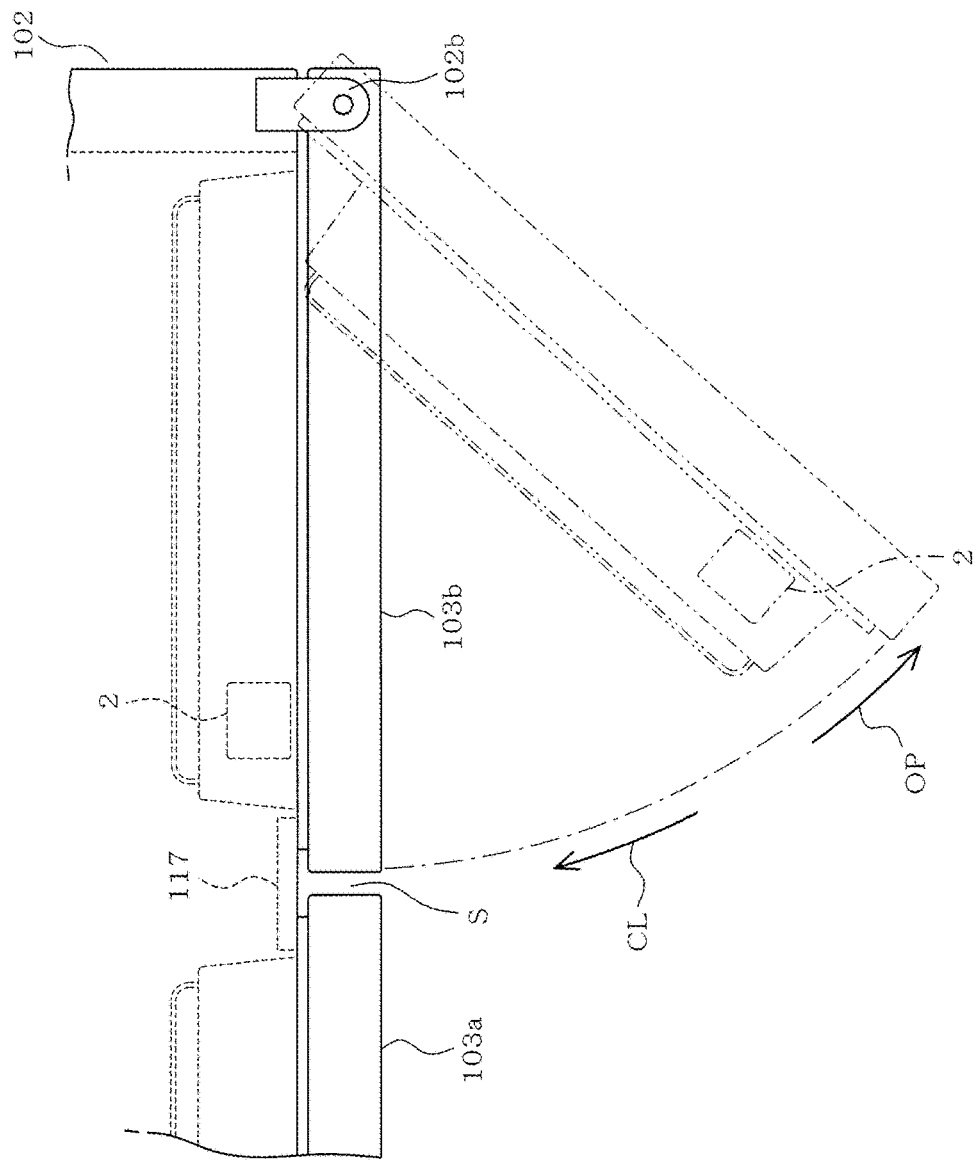
FIG. 13 is a plan view of a part of the right-side door.

The left-side door 103a and the right-side door 103b of the refrigeration chamber 103 are sized differently but are made of the same material. A description is given hereinafter based on the right-side door 103b. As illustrated in FIG. 12, the front surface of the right-side door 103b is formed by a glass plate 103b1 is configured by an insulative glass material and the rear surface (inner surface) is configured by an inner plate 114 made nonmetal resin and a vertical plate 115 (see FIG. 11). The interior of the right-side door is packed with a fill material such as urethane 103b2 serving as a thermal insulation material. That is, the front surface side of the left-side door 103a and the right-side door 103b are configured by the glass plate 103b1 being a nonmetallic material allowing permeation of electric waves. The door pockets 108a to 110a and 108b to 110b are provided on the inner plate 114. Further, the left-side door 103a is provided with a revolving vertical partition 117 made of nonmetal material such as synthetic resin provided so as to fill clearance S from the right-side door 103b as illustrated in FIGS. 11 and 13. Door 104a, etc. of the vegetable chamber 104 has its front surface covered by glass plate and its interior packed with urethane serving as a thermal insulation material as was the case for the right-side door 103b.

Figure 14:
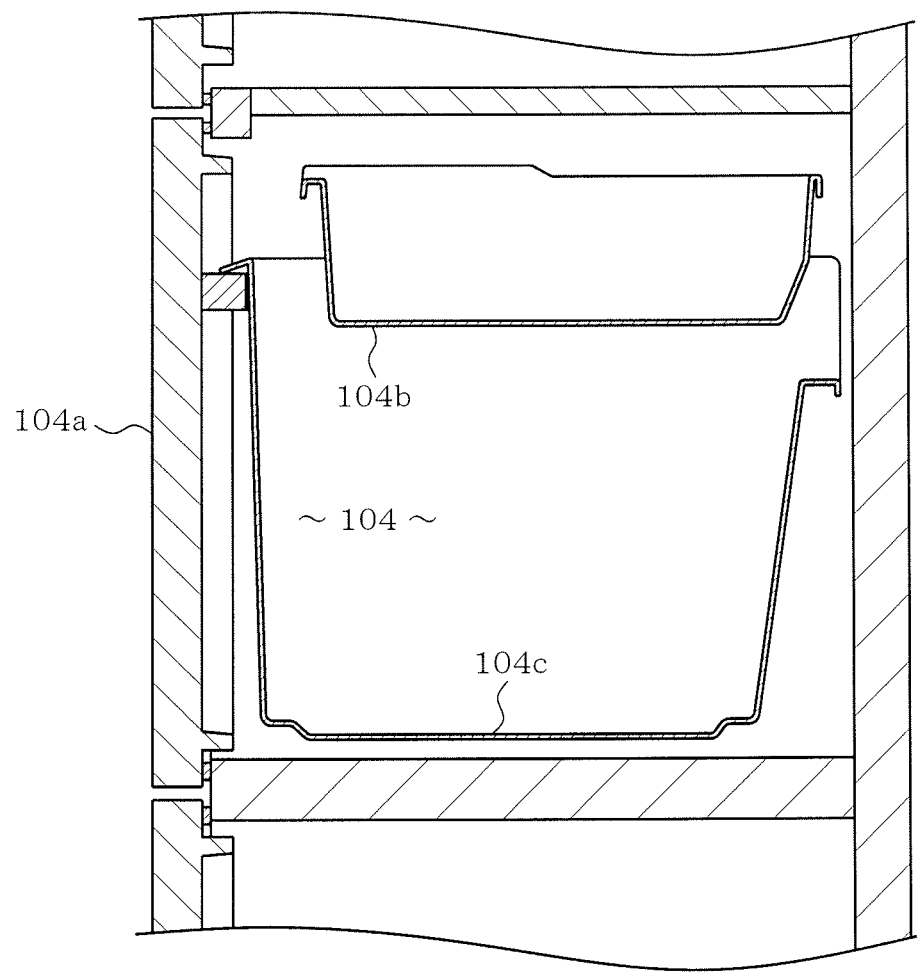
FIG. 14 is a broken side view of a vegetable chamber.

As illustrated in FIG. 14, the upper vegetable container 104b and the lower vegetable container 104c are provided inside the vegetable chamber 104. The upper vegetable container 104b is configured by a transparent material (synthetic resin). The lower vegetable container 104c may also be configured by a transparent material.

As illustrated in FIG. 12, the camera device 2 stored in a holder case 150 is mounted (disposed) on a mid-level door pocket 109b located at the vertical middle of the right-side door 103b. The camera device 2 is provided on the opening end side of the right-side door 103b as illustrated in FIGS. 11 and 13. The camera device 2 is disposed so that the image capturing portion 211 is oriented toward the interior of the storage (the first surface portion 201I faces the interior of the storage). When the camera device 2 is disposed on the right side door 103b, the slide switch 206 is turned ON meaning that the power is turned on (in an operative state).

Figure 15:
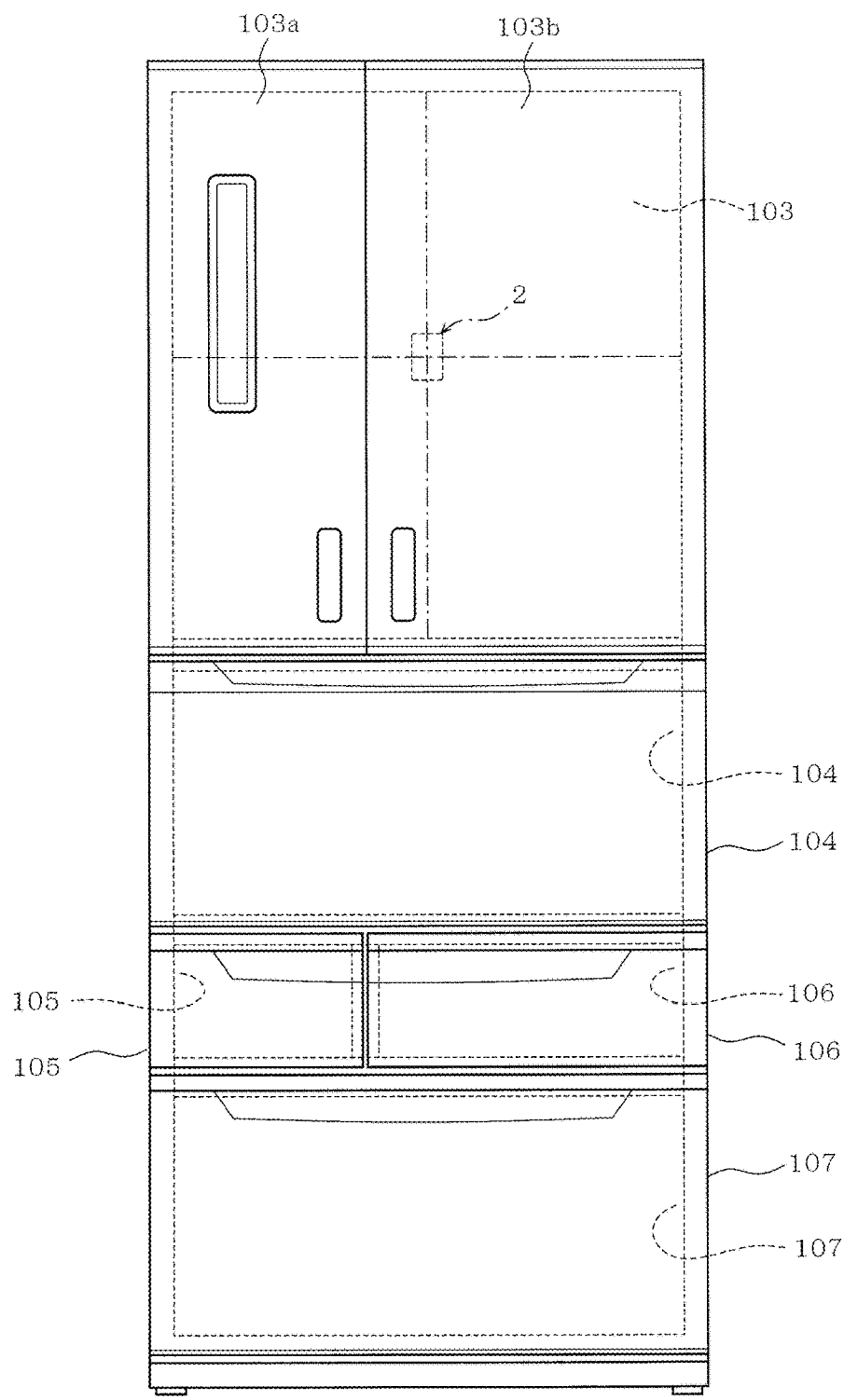
FIG. 15 is a front view of the refrigerator.
Figure 16:
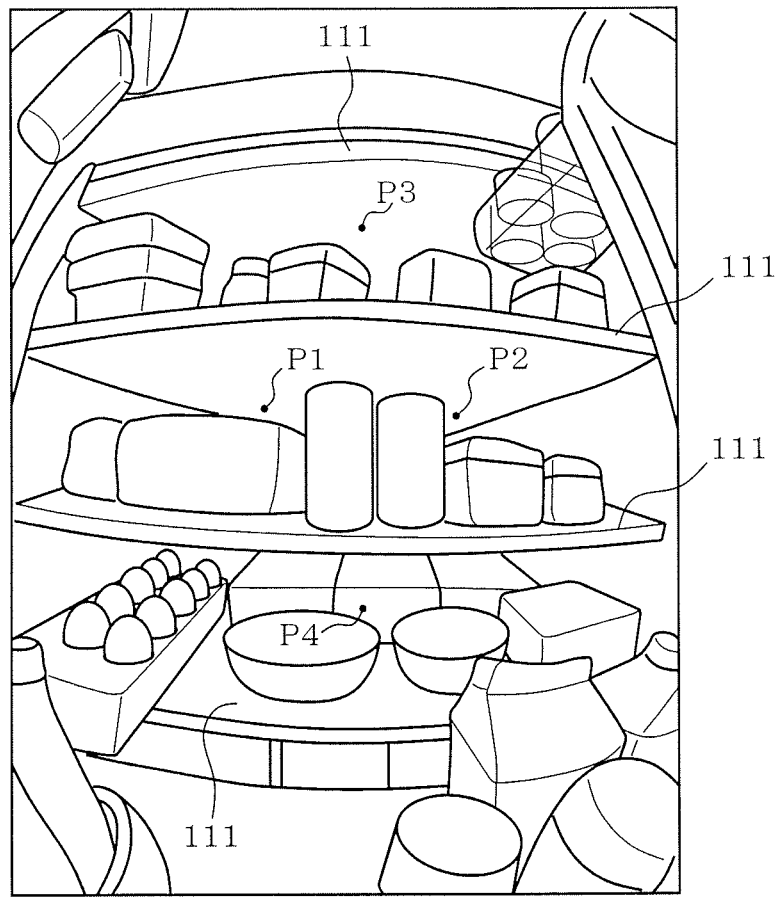
FIG. 16 illustrates one example of a captured image.

The length of the right-side door 103b is formed to be greater than length of the left-side door 103a. Thus, the camera device 2 is located substantially at the longitudinal and lateral center of the refrigerator 103 as illustrated in FIG. 15. Notably, the camera device 2 is located in the opening end side of the right-side door 103a. The distance from the hinge 102b side end of the right-side door 103a to the camera device 2 is greater than the length of the left-side door 103a. When the right-side door 103b is closed and the image capturing portion 211 is located at the center of the door comprising doors 103a and 103b, the image capturing range of the image capturing portion 211 of the camera device 2 includes the left and right edges in the far side of the storage (points P1 and P2 in FIG. 11) or the upper and lower edges in the far side of the storage (points P3 and P4 in FIG. 11). FIG. 16 illustrates one example of an image captured by the camera device 2. The image capturing range may be arranged to include points P11 to P18 indicated in FIG. 11.

The holder case 150 is disposed at the right-side door 103b and is shaped like an open top box as illustrated in FIGS. 12, 17, and 18. Height Hh of the wall 150a of the holder case 150, located proximal to the inner side of the storage, is configured to be greater than half the height of the case 200 of the camera device 2.

The image capturing portion 211 is oriented toward the interior of the refrigeration chamber 103 located inside the storage when the camera unit 2 (unit 2A) is installed in the location illustrated in FIG. 12. The substrate 212 is disposed more toward the outside of the refrigerator 1 compared to the image capturing portion 211 and the communication element comprising the communication module 213 is disposed more toward the outside of the refrigerator 1 compared to the substrate 212.

There is no metal member (such as reinforcement metal component, vacuum thermal insulation panel using metal deposition) in the portion of the right-side door 103b facing the communication module 213.

As illustrated in FIG. 12, the camera device 2 is installed in a position of the door (right-side door 103b) of the refrigerator 1 capable of capturing image of the interior of the refrigerator 1. The battery 208 is disposed in a location different from the portion E located between the communication module 213 and the right-side door 103b.

Figure 10:
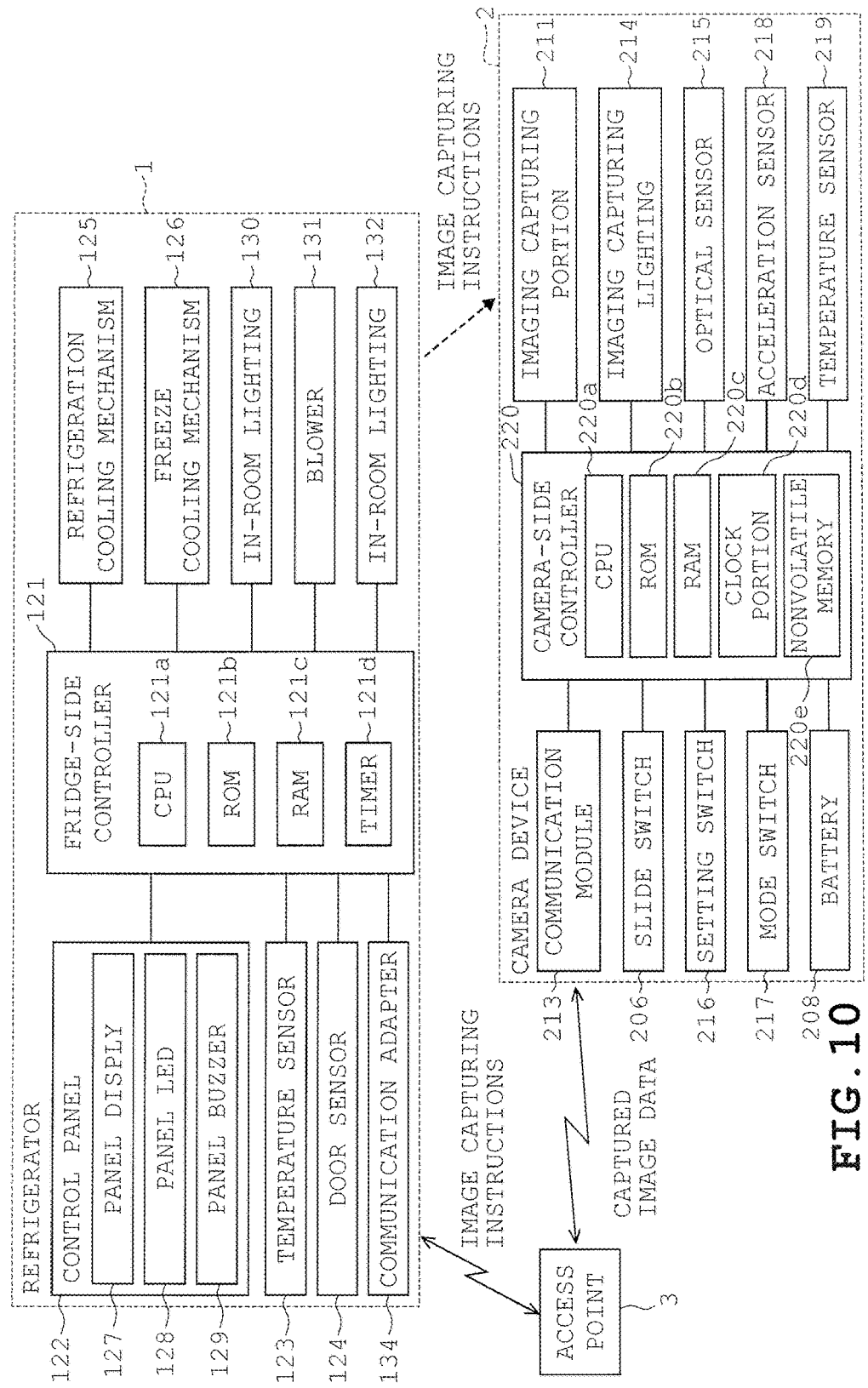
FIG. 10 is a block diagram indicating an electrical configuration of a refrigerator and a camera device.

The refrigerator 1 is provided with a fridge-side controller 121 illustrated in FIG. 10. The fridge-side controller 121 is configured by a microcomputer provided with CPU 121a, ROM 121b, RAM 121c, and timer 121d, etc. and is configured to control the overall operation of the refrigerator 1. More specifically, the fridge-side controller 121 controls the refrigeration cooling mechanism 125 and freeze cooling mechanism 126 configuring the known refrigeration cycle based on the temperature of the fridge interior detected by the temperature sensor 123 and by the opened/closed status of the door detected by the door sensor, etc. to achieve the operational status specified for example from the control panel 122.

The control panel 122 is provided with a panel display 127, a panel LED 128, and a panel buzzer 129. The panel display 127 is configured to display the specified settings, etc. The panel LED 128 is configured to illuminate the operation switches and indicate the operational status through illumination. The panel buzzer 129 is configured by a piezoelectric buzzer for example and notifies the type of operations made by producing a sound (sound energy) depending upon the operation made. The control panel 122 may disturb the communication performed by the communication module 213 serving as a communicating portion and thus, is preferably disposed in a location not facing the communication module 213. For example, the control panel 122 is preferably disposed on a door where the communication module 213 does not exist and not on a door where the communication module exists 213.

Figure 19:
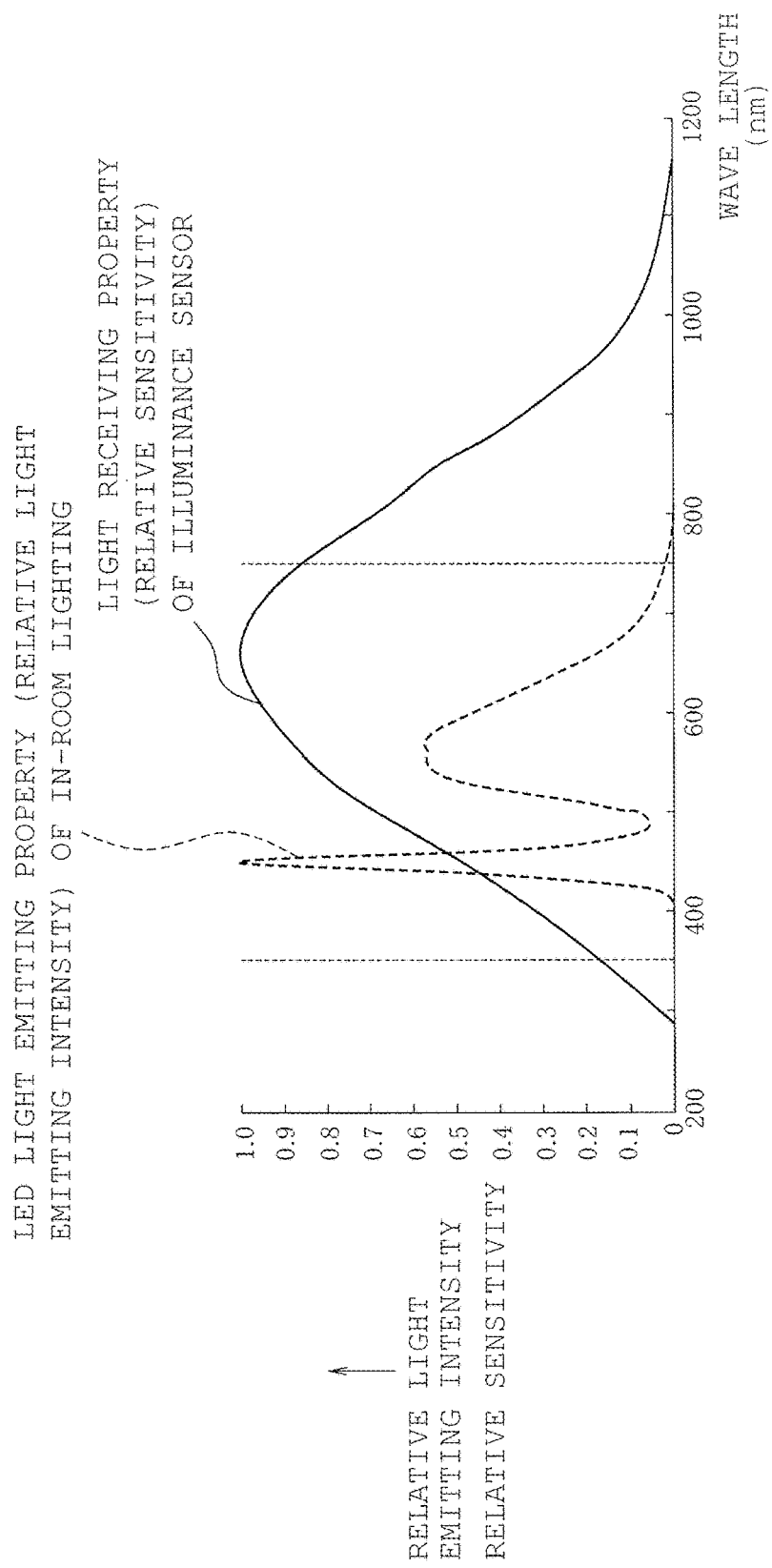
FIG. 19 is a chart indicating the light emitting properties of an in-room lighting and the light receiving properties of an illuminance sensor.

The in-room lightings 130 and 132 comprise an LED and are configured to illuminate when the door is opened. The in-room lightings 130 and 132 also serve as a signal output portion and is capable of flickering according to a prescribed pattern under the control of the fridge-side controller 121. The prescribed flickering pattern is a signal representing an image capturing instruction given by the camera device 2. The image capturing instruction given by the prescribed flickering pattern is received by the illuminance sensor 215. The light receiving properties of the illuminance sensor 215 is specified to be relatively the same as the light emitting properties of the LEDs of the in-room lightings 130 and 132. Substantially the same region within the wavelength region $\lambda\alpha$ illustrated in FIG. 19 is employed.

A blower 131 provided in the refrigerator 1 is configured to circulate cool air within the refrigerator 1 in normal operation. The communication adaptor 134 is provided detachably to the refrigerator 1 in the present embodiment. The communication adaptor 34 is configured to exchange communication with the access point 3 and with the operation terminal 4, etc. located in the room. Though only the refrigerator 1 is illustrated in FIG. 1, the communication adaptor 134 is also provided to other home appliances such as an air conditioner to establish a network of home appliances. The communication adaptor 134 is further configured to be capable of communicating directly with the image capturing device 2 without the intervention of the access point 3. The communication adaptor 134 is also used for visualization of system status, etc. as described earlier and thus, is basically operative while the refrigerator 1 is in service.

When the operation terminal 4 is operated by the user from remote locations to output an image capturing instruction, the image capturing instruction is transmitted to the refrigerator 1 through the external network 5 and access point 3.

Figure 20:
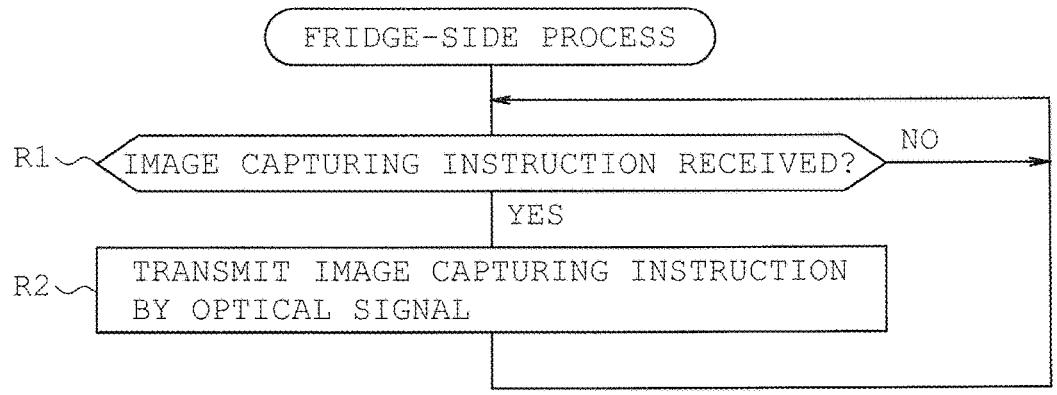
FIG. 20 is a flowchart indicating the control flow of the refrigerator.

When receiving the image capturing instruction, the refrigerator 1 makes a judgement that the image capturing instruction has been received at step R1 indicated in FIG. 20. Then, by flickering the in-room lightings 130 and 132 according to a prescribed pattern, the image capturing instruction is transmitted to the camera device 2 in the form of an optical signal (step R2).

Next, a description will be given on the operation of the camera device 2.

Figure 21:
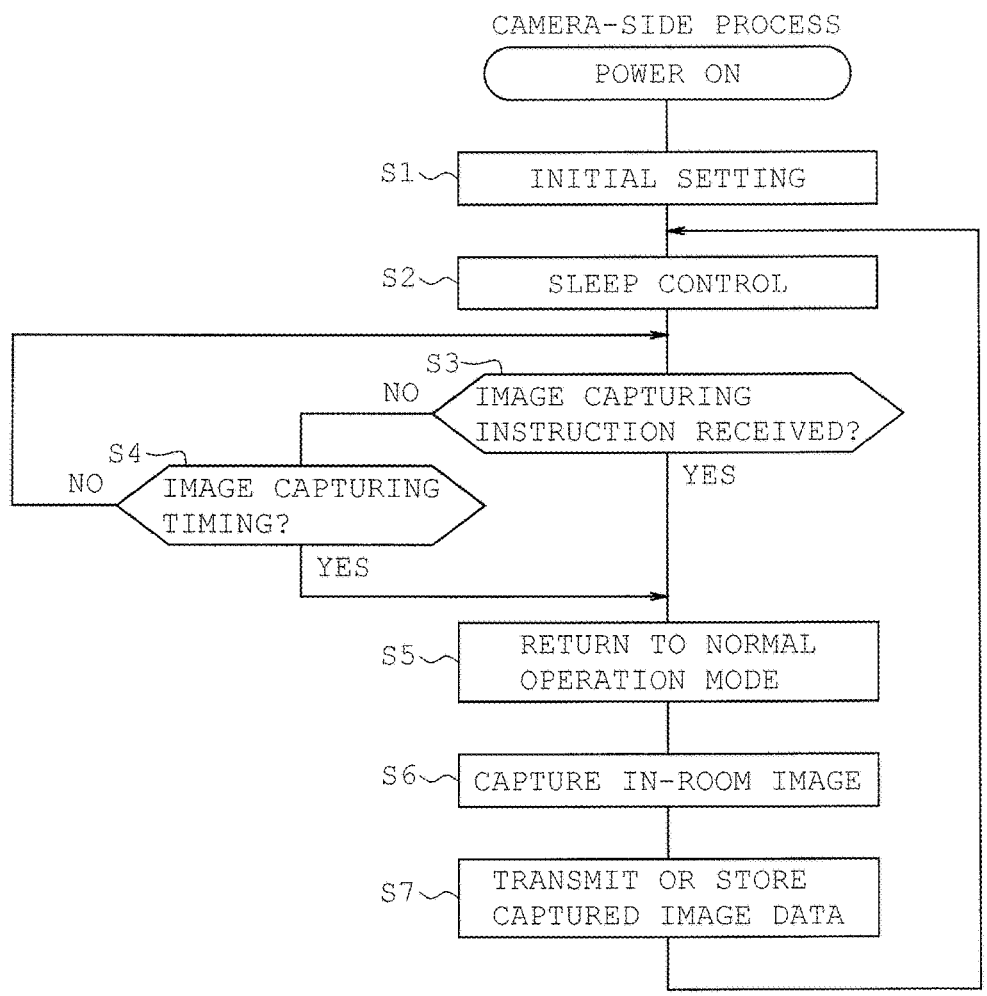
FIG. 21 is a flowchart indicating the control flow of the camera device.

When the slide switch 206 of the camera device 2 is turned ON, the power is turned ON to cause the camera-side controller 220 to execute the control indicated in FIG. 21. First, the initial settings are executed by the user (step S1). In the initial settings, settings for camera focus, timing of automatic image capturing (the time of image capturing executed on a daily basis), etc. are specified. The process thereafter proceeds to the sleep control (step S2, sleep controller). When operating under the sleep control, the functionalities of the camera device 2 are stopped with the exception of the functionality of receiving image capturing instruction given by the in-room lighting 130 or 132, and the functionality of judging whether or not the time kept by the time keeper 220d has reached the specified image capturing timing. It is thus, possible to suppress battery consumption of the battery 208 serving as the source of power. The operation of the communication module 213 is also stopped under the sleep control since constant operation of the communication module 213 accelerates the consumption of battery 208. The functionality for receiving image capturing instruction from the in-room lighting 130 or 132 consumes battery 208 at a slow pace. It is thus, possible to save battery consumption.

The control flow returns to the normal operation mode from the sleep control (step S5) when receiving image capturing instructions from the in-room lighting 130 or 132 (step S3) or when the time kept by the time keeper 220d reaches the image capturing timing (step S4). Then, the in-room image is captured (step S6) and the captured data is transmitted to the targeted system component (step S7).

The captured data is transmitted to the server 6 and saved at the server 6. The captured data is transmitted to the operation terminal 4 from the server 6.

The camera device 2 of the present embodiment is provided with the case 200 configured to be installable inside a storage; an image capturing portion 211 provided inside the case 200; and the image capture window 201b provided on the first surface portion 201I of the case 200 and configured for capturing image inside the storage by the image capturing element. The image capturing portion 211 is configured to capture image inside the storage where the case 200 is installed. It is possible to capture image inside the storage while allowing the image capturing portion 211 to be placed inside the case 200.

More specifically, the camera device 2 of the present embodiment is provided with the image capturing portion 211 and a communication element comprising the communication module 213 as illustrated in FIGS. 4 and 12. The image capturing portion 211 is configured to capture image of the interior of the refrigerator 1. The communication module 213 is configured to transmit the image captured by the image capturing portion 211 to a component outside the refrigerator 1. The communication module 213 is disposed more toward the outer side of the refrigerator 1 compared to the image capturing portion 211. According to the present embodiment, it is possible to reduce barriers to outgoing communication (transmission of captured images) from the communication module 213 to recipients outside the refrigerator 1 compared to configuration in which the communication module 213 is disposed in a location more proximal to the inner side of the refrigerator 1 compared to the image capturing portion 211, and thereby provide good outgoing communication. The camera device 2 may be embedded in the foamed thermally resistive material provided inside the door. In such case, the image capturing portion 211 may be configured to face the fridge interior through the inner plate of the door.

The camera device 2 of the present embodiment is provided with the substrate 212. The substrate 212 is located more toward the inner side of the refrigerator 1 compared to the communication module 213. As a result, the substrate 212 does not block the communication of the communication module 213 with the outside of the refrigerator 1 and thereby achieve good communication with external components.

Because circuit patterns made of metal materials are formed on the main substrate 212A and the auxiliary substrate 212B of the substrate 212, there is a risk of the communication performed by the communication module 213 being disturbed. However, because the substrate 212 is located more toward the inner side of the refrigerator 1 compared to the communication module 213, it is possible to prevent the metal circuit patterns from disturbing the communication between the communication module 213 and the outside of the refrigerator 1.

The circuit pattern is formed substantially throughout the auxiliary substrate 212B as a ground pattern 212Bc. It is thus, possible to improve the electric shielding properties of the case 200. The electric shielding properties, however, also operates as a strong shield to electric waves. According to the present embodiment, because the substrate 212 is located more towards the inner side of the refrigerator 1 than the communication module 213, the ground pattern 212Bc does not disturb the communication between the communication module 213 and the outside of the refrigerator 1.

The image capturing portion 211 and the communication module 213 of the present embodiment are organized into unit 2A. The battery 208 provided to the unit 2A is disposed in a location that does not cover the communication module 213. According to the present embodiment, it is possible to prevent the battery 208 from disturbing the communication of the communication module 213 even when the battery 208 containing metal component is provided in the unit 2A.

As illustrated in FIG. 12, the unit 2A is attached to a location capable of capturing image of the interior of the refrigerator 1 from the door (right-side door 103b) provided to the refrigerator 1. The battery 208 is disposed in a location different from portion E located between the communication module 213 and the right-side door 103b. According to the present embodiment, because the battery 208 is not disposed in the portion E existing in the direction of communication of the communication module 213 towards the outside of the refrigerator 1, the communication of the communication module 213 with the outside of the refrigerator 1 is not disturbed by the battery 208.

The unit 2A is configured by the image capturing portion 211, the substrate 212, and the communication module 213 stored in the case 200 made of nonmetal material. According to the present embodiment, the communication performance of the communication module 213 is not degraded even when placed inside the case 200.

The left-side door 103a and the right-side door 103b of the present embodiment is made of nonmetal material such as glass. According to the present embodiment, is possible to reduce the disturbance of communication performance of the communication module 213 by the door when the camera device 2 is located at the left-side door 103a or the right-side door 103b.

In the present embodiment, there is no metal member (such as reinforcement metal component, vacuum thermal insulation panel using metal deposition) in the portion of the right-side door 103b facing the communication module 213. According to the present embodiment, it is possible to provide good communication between the communication module 213 and external recipients. The reinforcement metal component is a component shaped like a flat plate mounted on the rear surface of the front plate of the glass door for adding strength to the glass. The reinforcement metal component may be mounted to a location not facing the communication module 213 such as a door not provided with the communication module 213 or the periphery of the communication module 213. It is possible to improve thermal insulativity without disturbing communication by providing the vacuum thermal insulation panel in locations similar to those described for reinforcement metal component. The vacuum thermal insulation panel comprises a bag formed of metal deposited films which is vacuumed after stuffing fiber such as glass wool.

The unit 2A is provided in the opening end side of the right-side door 103b of the present embodiment. In the present embodiment, by providing the unit 2A in the opening end side of the right-side door 103b, it is possible to proximate the unit 2A to the clearance S (or to the exterior of the refrigerator 1) between the right-side door 103b and the left-side door 103a to improve the communication by the communication module 213 as illustrated in FIG. 13.

Distance H1 (see FIG. 4) between the antenna 213c of the communication module 213 and the substrate 212 (main substrate 212A) of the present embodiment is configured to be equal to or less than ½ of the wavelength λ of wireless radio waves such as 10 mm. According to the present embodiment, it is possible to prevent the wireless radio waves from not reaching the communication module 213 when the communication module 213 attempts to receive radio waves from external components. When the distance between the antenna 213c of the communication module 213 and the substrate 212 (main substrate 212A) containing metal is a multiple of ½ of the wavelength λ (120 mm) of wireless radio waves such as 60 mm, 120 mm, and 180 mm, the incident wave and the reflective wave cancel one another and may cause the radio waves to be unreachable. Because the distance H1 is specified to be equal to or less than ½ of the wavelength λ of wireless radio waves such as 10 mm in the present embodiment, the above described measurements have been avoided to prevent the radio waves from being unreachable.

When the distance H1 is specified to 30 mm which is ¼ of the wavelength λ, there is a high possibility of the incident wave and the reflective wave coming into phase to double the intensity of the electric waves and improve communication performance even more effectively.

According to the present embodiment, the arrangement of the center of gravity G of the camera device 2 provides the following effects.

The camera device 2 is installed to a door of the refrigerator 1 and is provided with the case 200 and the image capturing portion 211 disposed inside the case 200. The image capturing portion 212 is configured to capture images of the interior of the refrigerator 1. The center of gravity G of the camera device 2 as a whole is arranged to be different from the center (volume center) C of the case 200. According to the present embodiment, it is possible to install the camera device 2 more steadily when placed in the case 200 so that the center of gravity G of the camera device 2 is located below the center C of the case 200 compared to being installed so that the center of gravity G of the camera device 2 is located above the center C of the case 200. It is thus, possible to prevent the camera device 2 from being displaced even when the right-side door 103b to which the camera device 2 is installed is opened or closed.

As illustrated in FIG. 4, the case 200 of the present embodiment is provided with the battery 208. The battery 208 is disposed in the lower portion of the case 200. According to the present embodiment, because the battery 208 having a large mass is provided in the lower portion of the case 200, it is possible to locate the center of gravity G of the entire camera device 2 in a position below the center C of the case 200.

In the present embodiment, operators 216b and 217b (serving as a switch and a preventing element) constituting a part of the setting switch 216 and the mode switch 217 are provided on the outer surface of the upper wall 201J of the case 200 located on the opposite side of the case 200 from where the battery 208 is disposed. According to the present embodiment, it is possible to prevent the case 200 from being disposed such that the battery 208 is located in the upper side of the case 200 (center of gravity G being located above the center C). When there is no setting switch 216 or mode switch 217 provided on the upper surface 201J located in the opposite side of the case 200 with respect to the battery 208, the user may unintentionally install the case 200 upside down in which the upper surface 201J faces downward as the placement surface (under surface) as there is no reason for the user to make the upper surface 201J to face upward. By providing switches comprising the setting switch 216 and the mode switch 217 serving as the preventing element on the upper surface 201J, it is possible to prevent the user from installing the case 200 upside down in which the upper surface 201J faces downward as the placement surface. As a result, it is possible to locate the center of gravity C of the camera device 2 as a whole to be located below the center C of the case 200. It is also possible to provide a preventing element comprising a pointed tip or a rounded tip on the upper surface 201J to make it difficult to use the upper surface 201J as the placement surface.

The case 200 of the present embodiment is mounted on the holder case 150 disposed at the right-side door 103b and being shaped like an open top box. The height Hh of the wall 150a of the holder case 150, located proximal to the inner side of the storage, is configured to be greater than half the height of the case 200 of the camera device 2. According to the present embodiment, it is possible to prevent the camera device 2 from falling out of the holder case 150 when opening or closing the right-side door 103b. That is, when the height Hn of the wall 150a of the holder case 150, located proximal to the inner side of the storage, is configured to be less than the half of the height of the case 200, it becomes easier for the case 200 to fall out of the holder case 150 when opening or closing the right-side door 103b. The present embodiment inhibits such occurrences.

The setting switch 216 and the mode switch 217 are configured in a different structure (configured as a push switch) from the slide switch. Thus, the operators 216a and 217a are not moved even when a force oriented in the opening direction (direction of arrow OP indicated in FIG. 13) and in the closing direction (direction of arrow CL in FIG. 13) are exerted when the right-side door 103b is opened or closed. This prevents unintended switching of the switches 216 and 217.

The present embodiment is provided with the slide switch 206 disposed on the right-side door 103b and being configured to be turned ON and OFF by sliding operation of the operator 206a. The operator 206a of the slide switch 206 is configured to slide in the up and down direction and the slide switch 206 is turned ON when the operator 206a is slid downward. According to the present embodiment, the slide switch 206 is not unintentionally turned OFF when the right-side door 103b is opened or closed. The operation 206a of the slide switch 206 slides in the up and down direction which is different from the direction in which the right-side door 103b is opened or closed. Thus, the operator 206a normally does not move neither in the opening direction nor the closing direction when the right-side door 103b is opened or closed. However, when the operator 206a is configured to be turned ON when the operator 206a is moved upward, the operator 206a may be switched off by moving in the gravitational direction (downward) depending upon the impact suffered when the right-side door 103b is strongly opened or closed. According to the present embodiment, the operator 206a is configured to slide in the up and down direction and turned ON when moved downward. Thus, when a downward force is exerted on the operator 206a by the impact suffered when the right-side door 103b is opened or closed, the operator 206a is already located in the downward position and thus, stays turned ON. Thus, there are no instances where the slide switch 206 is unintentionally turned OFF when the right-side door 103b is opened or closed.

The range of image capturing by the image capturing portion 211 includes left and right edges in the far side of the storage (points P1 and P2 in FIG. 11) or the upper and lower edges in the far side of the storage (points P3 and P4 in FIG. 11) when the image capturing portion 211 is located at the center of the door comprising the left-side door 103a and the right-side door 103b. The above described image capturing range of the present embodiment can be ensured even if the location of the camera device 2 is slightly shifted from the center of the door.

The range of image capturing by the image capturing portion 211 is preferably arranged to include the front end portions of every shelf 111 disposed inside the storage when the image capturing portion 211 is located at the center of the closed door (comprising the left-side door 103a and the right-side door 103b). It is especially preferably to include the left and right end portions of the front end portions of the shelves 111 (points P11 to P18 in FIG. 11). When there is only one shelf 111, the left and right end portions of the front end portion are preferably included in the image capturing range.

It is further preferable to include the front end portions of at least two adjacent shelves among multiple shelves disposed in the up and down direction. It is especially preferable to include the left and right end portions of the front end portion (points P11 to P14, or P13 to P16, or P15 to P18) in the image capturing range. At least the left and right end portions of the front end portion of the uppermost shelf 111 and the lowermost shelf 111 (points P11, P12, P17, and P18) may be included in the image capturing range in FIG. 11.

The image capturing element 211 is provided with a wide lens. It is thus, possible to capture a wide image of the storage interior even when there is not much distance between the image capturing portion 211 and the storage item (shelf 111).

As illustrated in FIG. 4, the image capturing portion 211, the substrate 212, and the communication element comprising a communication module 213 are disposed in the listed sequence inside the case 200. The battery 208 is disposed below the image capturing portion 211, the substrate 212, and the communication module 213. It is thus, possible in the present embodiment to lower the center of gravity G of the camera device 2 below the center C of the case 200.

FIGS. 22 to 36 illustrate a second to ninth embodiment. The elements that are identical to those already described are identified with identical reference symbols for ease of explanation and are not re-described. While the differences from the first embodiment are described, the first embodiment will be described in more detail.

Second Embodiment

In the embodiment described above, the camera device 2 is organized into unit 2A (integrated structure) comprising case 200 containing image capturing portion 211, substrate 212, and communication module 213. The communication module 213 may be isolated from the case 200. This will allow the communication module 213 to be disposed wherever appropriate for good communication.

As illustrated in FIG. 22 of the second embodiment for example, the camera device 2 may be configured by the communication module 213 and a unit 2A' free of the communication 213. The communication module 213 may be provided in the upper portion of the opening end side of the right-side door 103b. Providing the access point 3 in the upper portion (hinge portion) of the refrigerator 1 will improve communication performance.

The communication module 213 may be provided in the control panel. The communication module 213 may be installed in a storage space provided inside the urethane from the front surface of the front panel of the glass door. The communication module 213 may be provided on a substrate provided with a capacitance detector allowing user operation on the front surface of the front panel of the glass door. It is possible to reduce the length of electric connection lines by providing the substrate at a location facing the image capturing portion 211. The substrate may be configured to be insertable/removable from the storage space. The storage space is preferably provided near the edge of the door and rendered accessible from an opening so that the substrate may be inserted into or removed from the opening. This will allow the communication module 213 to be removed from the door to be subjected to maintenance. Providing metal parts (such as metal plates for adding structural strength and vacuum thermal insulation panels, for example) will not disturb communication as long as they are provided in the storage interior side of the storage space.

The door for installing the camera device may be a drawer-type door. The door for installing the camera device may be a single door instead of a double door opening in a direction opposed from one another. The storage is not limited to a refrigerator but may be a refrigeration case, a container, or a storage ware house.

Third Embodiment

The configuration of the refrigerator 1 and the camera device 2 in the third embodiment is basically the same as those of the first embodiment. A description will be given hereinafter with an emphasis on the refrigerator 1 being a food storage and the camera device 2 being provided with a water proof element. Effects achieved by the embodiment and modified examples will also be discussed.

The refrigeration cycle of the refrigerator 1 is configured by connecting a cooler, a condenser, and a compressor with a piping. Cool air is blown into the fridge by an airflow produced by the fan. The refrigerant of the refrigeration cycle employs flammable refrigerant such as isobutane R600, etc.

The camera device 2 of the third embodiment is used in a food storage and placed inside the refrigerator 1. The specification of the battery 208 of the camera device 2 is 30 W and 6.0V. In the body case 201 of the camera device illustrated in FIG. 3, the packing 203 and 210, and the O ring 211*f* serve as both a water proof element and an explosion proof element. Further, the structure in which the reed switch 206*c* and the operator 206*a* are isolated by the wall of the recess 201*f* provided on the right-side wall 201M is referred to as the water proof-explosion proof element.

The refrigerator 1 being one example of the food storage often store liquid (water, juice, soup, etc.) and liquid substances (mayonnaise, curry, etc.). The user may accidently spill the liquids or the liquid substances inside the refrigerator 1 when taking food in and out of the refrigerator 1. Food covered in dew or water may be stored in the refrigerator 1. In such case, image capturing may not work well when the liquid or liquid substance attach to the lens and pour into the case.

In this respect, the camera device 2 is provided with the image capturing portion 211 configured to capture image of the interior of the refrigerator 1, the case 200 containing the image capturing portion 211, and the water proof element configured to provide a water-tightly seal between the inside and the outside of the case 200. According to the third embodiment (as well as the first and the second embodiment), it is possible to prevent liquid and liquid substance attached to the camera device 2 from entering into the case 200.

The case 200 of the camera device 2 comprises a first case comprising the body case 201 and a second case comprising the lid case 202 joined with one another over a water proof element comprising the packing 203. It is thus, possible to prevent intrusion of liquid from the joining portion of the case 200.

Battery storage 207 is provided inside the case 200 of the camera device 2. The battery storage 207 is provided with opening 207*a* for taking the battery in and out. The battery 208 is inserted in place through the opening 207*a*. The opening 207*a* of the battery storage 207 is opened and closed by a battery lid 209. A water proof element comprising a packing 210 is provided between the opening 207*a* and the battery lid 209.

The battery is used as the source of power so that the camera device 2 may be located in any given location. Further, a sleep control is normally performed to suppress battery consumption. When the battery 208 gets wet by exposure to liquid, the battery 208 may be shorted or cause unexpected electric current to flow through the circuit and use up the battery in a short period of time. In this respect, the camera device 2 is provided with a packing 210 between the opening 207*a* of the battery storage 207 and the battery lid 209 to prevent liquid, etc. from entering the battery storage 207. It is thus, possible to prevent the battery 208 from getting wet by exposure to liquid.

The battery lid 209 is screw fastened to the opening 207*a* of the battery storage 207. It is thus, possible to attach the battery lid 209 more tightly to the opening 207*a* compared to attachment through engagement and achieve the water proof effect more reliably.

Because the packings 203 and 210 are made of silicone rubber, optimal flexibility required for exerting water proof functionality can be obtained to provide excellent water proof performance.

The image capture window 201*b* is further provided on the case 200 and the lens holder 211*a* serving as the outer housing of the image capturing portion 211 is inserted into the image capture window 201*b*. A water proof element comprising an O ring is provided between the lens holder 211*a* and the image capture window 201*b* to prevent liquid, etc. from entering the case 200 from the image capture window 201*b*.

Apart from the image capture window 201*b*, components such as the image capture lighting windows 201*c* and illuminance sensor window 201*d* are provided on the first surface portion 201I of the case 200 provided with the image capture window 201*b*.

In the above described configuration, a water proof element comprising the cover member 204 is attached to the first surface portion 201I. A hole 204*a* is formed on the portion of the cover member 204 opposing the image capture window 201*b*. The hole 204*a* allows the image capture window 201*b* to face the outside of the cover member 204. There are no other holes formed on the cover member 204 besides the hole 204*a*. In the present embodiment, it is possible to provide water proof protection on the first surface portion 201I except for the image capture window 201*b* and thus, water proof protection can be provided for the image capture lighting windows 201*c* and the illuminance sensor window 201*d* and thereby prevent intrusion of liquid from the image capture lighting windows 201*c* and the illuminance sensor window 201*d*.

In the above described structure, cover member 204 is bonded on the first surface portion 201I of the case 200. It is thus, possible to facilitate the attachment of the cover member 204 on the first surface portion 201I.

The illuminance sensor 215 is provided inside the case 200 of the camera device 2. The illuminance sensor window 201d is formed on the first surface portion 201I of the case 200 to allow the illuminance sensor 215 to face the outside of the illuminance case 200. The cover member 204 is made of a transparent material. A design is printed on the cover member 204. However, the design is not printed on the portion of the cover member 204 facing the illuminance sensor window 201d. Because the cover member 204 of the camera device 2 is made of a transparent material and the design is not printed on the portion of the cover member 204 facing the illuminance sensor window 201d, it is possible to provide water proof protection to the illuminance sensor window 201d by the cover member 204 while securing incidence of light into the illuminance sensor window 201d from the outside. It is thus, possible to ensure smooth sensing by the illuminance sensor 215.

The printed design is formed on the surface of the cover member 204 being attached to the case 200, that is, on the inner surface of the cover member 204. Thus, the printed design will not be damaged by, for example, scratching with another object when installing or using the camera device 2.

The camera device 2 is provided with a setting switch 216 comprising a push switch and a mode switch 217 inside the case 200. Switch through holes 201e are provided on the case 200 to allow the operators 216a and 217a of each of the switches to be operated from outside the case 200. The switch through holes 201e are covered by a water proof element comprising a switch cover 205. The switch cover 205 prevents liquid from entering the switch through holes 201e provided on the case 200.

A switch cover 205 for covering the switch holes 201e is applied by bonding on an upper surface 201J of the case 200 of the camera device 2 where the switch holes 201e are provided. It is thus, possible to apply (attach) the switch cover 205 on the upper surface 201J with ease.

Designs 205a are printed on the switch cover 205 of the camera device 2. The designs 205a are printed on the surface of the switch cover 205 being bonded on the upper surface 201J. It is possible to prevent the designs 205a from being damaged by, for example, scratching with another object when installing or using the camera device 2.

The camera device 2 is provided with the reed switch 206c on the right-side wall 201M of the case 200. The operating member 206a provided with the magnet 206b is disposed movably on an outer surface of the right-side wall 201M, the operating member 206a being movable between a position opposing the reed switch 206c over the right-side wall 201M and a position not opposing the reed switch 206c over right-side wall 201M. The structure in which the reed switch 206c and the operating member 206a are isolated by the right-side wall 201M is referred to as the water proof element. It is thus, possible to provide water proof protection between the operator 206a and the reed switch 206c by the wall of the case 200.

As illustrated in FIG. 4, connection terminals comprising battery connection terminals 212Bb configured to establish connection with electrical components and comprising flexible cables 211g, 212Bd, and 212Aa provided inside the case 200. The connection terminals are disposed so as to be distanced from the inner surface of the case 200. As a result, it is possible to prevent the connection terminals from getting wet even when dew condensate develops on the inner surface of the case 200. Because the battery 208 is also distanced from the inner surface of the case 200, it is possible to prevent the battery 208 from getting wet by the dew condensate.

The substrate 212 (212A, 212B) is distanced from the inner surface of the case 200 as illustrated in FIG. 4. It is thus, possible prevent the substrate 212 from getting wet even when dew condensate develops on the inner surface of the case 200.

The outermost surface of the image capturing portion 211 of the camera device 2 is retracted with respect to the outer most portion of the image capture window 201b. Thus, the image capturing portion 211 will not be scratched or damaged by the shelf 111 in the present embodiment, even when the camera device 2 is disposed with the first surface portion 201I facing downward so that the first surface portion 201I is placed for example on the upper surface of the shelf 111.

The battery 208 of the camera device 2 comprises a lithium battery. Thus, a long battery life is ensured in a refrigeration temperature zone when the food storage is a refrigerator 1. The camera device 2 is thus, suitable for use in a refrigerator.

The battery 208 comprises a primary battery and thus, dew condensate does not easily develop unlike the secondary battery. The camera device 2, therefore does not easily breakdown. Temperature elevation of a secondary battery measured on completion of battery recharge is high. Thus, facilitates development of dew condensate on the battery surface.

FIGS. 23 and 24 illustrate modified examples of the water proof element of the third embodiment. As illustrated in FIG. 23, the cover member 204 may be configured to cover the first surface portion 201I of the case 200 including the image capture window 201b. In such case, the entire surface of the image capture window 201b is preferably planarized.

As illustrated in FIG. 24, a waterproof element comprising a water proof sheet 230 formed of a transparent member may be provided on the front side (in the image capturing direction) of the lens comprising the outer lens 211 of the image capturing portion 211. As a result, it is possible to damage proof and water proof the outer lens 211b.

The food storage is not limited to a refrigerator but may be a refrigeration case or a food storage warehouse.

The refrigeration cycle employs flammable refrigerant. The water proof element described above also serves as an explosion proof element. It is thus, possible to prevent the flammable refrigerant from entering the camera device 2 which is an electric product and provide explosion proof function even when refrigerant leaks into the refrigerator with the camera device disposed inside the refrigerator provided with refrigeration cycle using flammable refrigerant. A battery having a low voltage of a prescribed level being less than 100V (such as 6.0V) is used in applying voltages to the electrical connection portions of the image capturing element, the communication element, etc. instead of the commercial voltage of 100V. Such configuration serves as an explosion proof element to prevent ignition.

Fourth Embodiment

FIGS. 25 to 27 each pertains to a fourth embodiment and illustrates an example of a slide switch 206. The orientation of the slide switches 206 (or the orientation of the characters "ON" and "OFF") differ in each of FIGS. 25 to 27 but the switches are identified with identical reference symbol for ease of explanation.

In the first embodiment, the slide switch 206 is configured to slide its operator 206a in the up and down direction. The operator 206a of the slide switch 206 may be configured to slide in a direction different from the up and down direction as will be described in the fourth embodiment.

The slide switch 206 of the fourth embodiment illustrated in FIG. 25 is provided so that the operator 206a is located on the upper surface 201J of the case 200. The operator 206a slides substantially in the same direction as the direction of opening and closing of the right-side door 103b (directions indicated by arrow OP and arrow CL). The switch is turned ON when the operator 206a is moved to the direction in which the right-side door 103b is closed (direction indicated by arrow CL). In the present embodiment, force is exerted on the operator 206a in the opening direction or the closing direction when the door is right-side door 103b is opened or closed. Greater force is exerted in the direction to close the door especially by the impact experienced when the right-side door 103b is closed. Because the switch 206 is configured to be turned ON when moved to the direction in which the right-side door 103b is closed, the operator 206a, already being in the turned ON position in the opening direction side, stays unmoved in the ON state even when a large force is exerted in the closing direction. Thus, the slide switch 206 will not easily turn OFF when opening or closing the right-side door 103b.

The slide switch 206 illustrated in FIG. 26 is provided so that the operator 206a is located on the upper surface 201J of the case 200. The operator 206a slides in the direction substantially orthogonal (direction indicated by arrow Q and the opposite direction) to the direction of opening and closing of the right-side door 103b (the revolving direction since the right-side door 103b is a revolving-type). The operator 206a is turned ON when moved to the direction toward the opening/closing end of the door (direction indicated by arrow Q). By providing the slide switch 206 so that the operator 206a is located on the upper surface 201J of the case 200 so as to slide in the direction substantially orthogonal (direction indicated by arrow Q and the opposite direction) to the direction of opening and closing of the right-side door 103b (the revolving direction since the right-side door 103b is a revolving-type) as is the case in the present embodiment, centrifugal force is exerted on the operator 206a when the right-side door 103b is closed. Because the operator 206a is configured to be turned ON when moved to in a direction oriented from the center of rotation of the right-side door 103b to the opening/closing end of the door (direction indicated by arrow Q), the operator 206a, already being in the turned ON position, stays unmoved in the ON state even when a large centrifugal force is exerted in the closing direction. Thus, the slide switch 206 will not easily turn OFF when opening or closing the right-side door 103b.

The slide switch 206 illustrated in FIG. 27 is the same as the slide switch 206 illustrated in FIG. 26 except for the operator 206a being provided on the right surface 201M of the case 200. The slide switch 206 illustrated in FIG. 27 provided the effects similar to those of the slide switch 206 illustrated in FIG. 26.

Fifth Embodiment

FIG. 28 corresponding to FIG. 18 illustrates the camera device 2 of the fifth embodiment. As illustrated in FIG. 28, the camera device 2 may be configured so that the image capturing portion 211 is located below the vertical center (represented by the reference symbol C1) of the case 200. As a result, it is possible to reduce the shifting of the image capturing range even when the camera device 2 moves (the upper portion tilts) when opening or closing the right-side door 103b since the movement of the image capturing portion 211 can be made small.

The door in which the camera device is placed may be a drawer-type door, in which case, the camera will not be displaced from its original place of installation even when the drawer-type door is opened or closed. The door for installing the camera device may be a single door as described earlier. The clearance between the door pocket 109b and the camera device 2 illustrated in FIG. 12 and is preferably specified to be equal to less than a length that would inhibit storage of a PET bottle containing beverages (Preferably 7 cm being equal to or less than 8.9 cm which is the outer diameter of a 1.5 liter PET bottle and more preferably specified to 5 cm being equal to or less than 6.8 cm which is the outer diameter of a 500 milliliter PET bottle). It is preferable to employ a configuration inhibiting the storage of PET bottles since a PET bottle, when placed in front of the camera device 2, disables image capturing.

Sixth Embodiment

FIGS. 29 to 31 pertain to the sixth embodiment. A description will be given on the differences from the first embodiment as well as similarities with the first embodiment in terms of effects achievable with focus placed on the positioning of the camera device 2 and on the lens provided to the camera device 2. As illustrated in FIG. 31, the image capture window 201b is tapered so as to increase its diameter toward the outer side. Thus, the image capture window 201b will not interfere with the range of image capturing of the later described image capturing portion 211.

As illustrated in FIG. 29, the multiple shelves 111a to 111d of the sixth embodiment corresponds to a plate member made of, for example, a transparent material such as glass. Each of the shelves 111a to 111d are substantially horizontal and are parallel to one another.

As illustrated in FIGS. 29 and 30, the camera device 2 is disposed, for example, on the upper surface of the uppermost shelf 111a. The location where the camera device 2 is to be disposed is designated by the locating member 180. In the present embodiment, the plate member comprises substantially horizontal shelves 111a to 111d. The first surface portion 201I serving as the placement surface is placed on the upper surface of the shelf 111a. The range of image capturing by the image capturing portion 211 when the first surface portion 201I of the case 200 is placed downwardly on the center of the bottom surface of the uppermost shelf 111a includes the left and right end portions or the front and rear ends of the bottom surface of the storage interior (the refrigeration chamber 103 in this example). When the camera device 2 is installed in the above described manner, the lens (the outermost lens 211b) does not contact the shelf 111a as can been seen in FIG. 31.

In the sixth embodiment, the camera device 2 is provided with the case 200 and the image capturing portion 211 provided inside the case and serving as an image capturing element. The camera device 2 is configured to capture image of the inside of the refrigeration chamber 103 (inside of the storage chamber) by the image capturing portion 211 through the image capture window 201b provided on the first surface portion 201I of the case 200. The camera device 2 is placed on the shelf 111a provided in the refrigerator 1 so that the first surface portion 201I of the case 200 faces the interior of the refrigeration chamber 103. The shelf 111a is an example of a plate member for placing storage items.

The shelves 111a to 111d are provided for placing storage items and thus, are disposed so as to be substantially horizontal. Hence, they are suitable for installing the case 200 of the camera device 2. Especially when the first surface portion 201I (the surface where the outer lens 211b is provided and facing the direction of image capturing) of the case 200 is downwardly placed on the upper surface of the uppermost shelf 111a, it is possible to obtain a wide image capturing range of the storage interior. It is thus, possible in the present embodiment to orient the camera device 2 in the appropriate image capturing direction by utilizing the shelf 111a. It is possible to capture image below the shelf 111a since the shelf 111a is made of a transparent member. When the shelf 111a is not transparent, a hole for image capturing may be formed on a portion of the shelf 111a corresponding to the image capturing portion 211.

The lens provided to the image capturing portion 211 comprises an outer lens 211 and a lens assembly 211c. The outer lens 211b is disposed at the image capture window 201b so as not to contact the shelf 111a. It is thus, possible to prevent the outer lens 211b from being contaminated or damaged.

The outer lens 211b is provided in a location retracted from the first surface portion 201I of the case 200. It is thus, possible to prevent the outer lens 211b from being contaminated or damaged. The outer lens 211b does not project from the first surface portion 201I and thus. The first surface portion 201I may thus, be planarized and be used as the placement surface.

The lens comprises a wide-angle lens configured by the outer lens 211b and the lens assembly 211c. It has been arranged so that the edges of the image capture window 201b do not interfere with the image capturing range of the image capturing portion 211 though a wide-angle lens is being used. It is thus, possible in the present embodiment to make full use of the wide image capturing range provided by the wide-angle lens in image capturing.

In the present embodiment, the lens comprises a wide angle lens and the plate member comprises plural shelves 111a to 111d each being substantially horizontal. The first surface portion 201I of the case 200 is disposed facing downward at the center of an upper surface of the uppermost shelf 111a. The range of image capturing by the image capturing element includes the left and right edges of a bottom surface of the storage or the front and rear edges of the bottom surface of the storage. It is thus, possible to capture image of a sufficiently wide range of the storage interior.

The shelf 111a being one example of a plate member is made of a transparent material. It is thus, possible to capture image below the shelf 111a even when the first surface portion 201I of the case 200 is placed on the upper surface of the shelf 111a.

The illuminance sensor 215 is provided on the first surface portion 201I of the case 200. In the present embodiment, it is possible to detect light inside the storage (flickering of the in-room lightings 130 and 132 according to a prescribed pattern) even when the first surface portion 201I is placed on the plate member since the plate member is transparent. The lens is arranged to face the first surface portion 201I and the first surface portion 201I is arranged to receive light (flickering in the prescribed pattern) from the in-room lightings 130 and 132. Thus, providing the illuminance sensors 215 on the first surface portion 201I facilitates light reception form the in-room lightings 130 and 132.

The case 200 is formed into a cuboid. It is thus, possible to use any of the surfaces as the placement surface. For example, the first surface portion 201I may face upward or sideways.

The image capture window 201b is formed at the center of the first surface portion 201I of the case 200. For example, when relocating the camera device 2 in FIGS. 30 and 31, it is possible to capture images of the same image capturing range even when the case 200 is turned 180 degrees in the horizontal direction.

The first surface portion 201I of the case 200 is provided with the image capture lighting 214 serving as the image capture lighting for illuminating the interior of the storage. It is thus, possible to capture good image in the dark when the door of the storage is closed. Plural image capturing lightings 214 are provided around the image capture window 201b in the present embodiment. It is thus, possible to cast wide range of light on the view of the image capturing portion 211.

Plural image capture lightings 214 are provided on two opposing sides of the image capture window 201b. It is thus, possible to cast light on both sides of the center of image capturing and cast light on the entire image capturing range regardless of whether the image capturing range is longitudinally elongate or laterally elongate.

The image capture lightings 214 are distanced equally from the image capture window 201b. It is thus, possible to evenly illuminate the image capturing view of the image capturing portion 211.

An illuminance sensor 215 is provided on the first surface portion 201I of the case 200. The light receiving properties of the illuminance sensor 215 is configured to be substantially identical to the light emitting properties of the in-room lightings 130 and 132 serving as illuminating elements provided in the storage. This improves the light sensitivity of the illuminance sensor 215 and allow the image capturing instructions (flickering of light in the prescribed pattern) to be reliably detected.

A projection may be provided on the first surface portion 201I of the case 200 that projects further outward from the case 200 than the lens (outer lens 211b). This will prevent the lens from contacting the shelf 111a.

Seventh Embodiment

FIGS. 32 and 33 pertain to a seventh embodiment where FIG. 32 is a broken side view and FIG. 33 is a front view of the vegetable chamber. In the seventh embodiment, the plate member comprises a shelf and upper and lower storage containers, namely upper vegetable container 104b and lower vegetable container 104c. The first surface portion 201I of the case 200 may be placed on the upper surface of the bottom portion of the upper vegetable container 104b. In such case, the range of image capturing by the image capturing portion 211 when the first surface portion 201I of the case 200 is placed downwardly on the center of the bottom surface of the upper vegetable container 104b includes the left and right end portions or the front and rear end portions of the bottom surface of the lower vegetable container 104c.

In the seventh embodiment, it is possible to dispose the case 200 in the proper orientation (the orientation for capturing image of the interior of the lower vegetable container 104c) by utilizing the upper vegetable container 102b while achieving proper range of image capturing.

An operating portion of a switch may be provided on the first surface portion 201I of the case 200, in which case, the operating portion is preferably coplanar with or retracted relative to the first surface portion 201I. By doing so, it is possible to place the first surface portion 201I on the plate member (use the first surface portion 201I as the placement surface) when the operating portion of the switch is provided on the first surface portion 201I.

An illuminance sensor may be provided on a surface of the case 200 different from the first surface portion 201I. As a result it is possible to receive the light of the prescribed flickering pattern produced by the in-room lightings 130 and 132 when the first surface portion 201I is used as the placement surface.

Eighth Embodiment

In an eight embodiment, the camera device 2 may be configured so that the image capturing portion 211 projects from the image capture window 201b provided on the first surface portion 201I of the case 200 as illustrated in FIG. 34. In such case, a mounting member 235 is preferably disposed on the firsts surface portion 201I side to prevent the outer lens of the image capturing portion 211 from contacting the shelf 111a (plate member).

Ninth Embodiment

In a ninth embodiment, the first surface portion 201I of the case 200 may be disposed on the inner surface of the vertical wall of the door pocket 109b as illustrated in FIG. 35. The door pocket 109b is also referred to as a plate member. In such case, the vertical wall of the door pocket 109b faces the fridge interior and thus, the first surface portion 201I also faces the fridge interior. It is thus, possible to dispose the first surface portion 201I in the appropriate orientation by utilizing the door pocket 109b.

The elements of the embodiments described above may be combined with one another. Elements may be further added, removed, or replaced with another.

For example, the configurations of: "the communication module 213 being located further to the outer side of the refrigerator 1 than the image capturing portion 211"; "providing a water-tight seal between the inside and the outside of the case 200"; "the center of gravity G of the entire camera device 2 being disposed in a different location from the center (volume center) C of the case 200"; and "the case 200 being installed in the refrigerator 1 provided with a plate member for placement of a stored item comprising shelf 111a, so that the case is placed on the plate member with the first surface portion facing the interior of the storage" may all be implemented or may be selectively implemented.

The following embodiments taken alone or in combination falls within the scope and the spirit of the invention.

In some embodiments of the camera device for use in a storage, the substrate has a metal circuit pattern formed thereon.

In some embodiments of the camera device for use in a storage, the circuit pattern comprises a ground pattern formed substantially throughout the surface of the substrate.

In some embodiments of the camera device for use in a storage, the unit is mounted on a door of a storage so as to be capable of capturing image of the interior of the storage, and wherein the battery is provided in a location different from a portion between the communication element and the door.

In some embodiments of the camera device for use in a storage, the door comprises a nonmetal material.

In some embodiments of the camera device for use in a storage, the unit is located on an opening end side of the door.

In some embodiments of the camera device for use in a storage, the case comprises a first case and a second case joined with one another over a water proof element comprising a packing.

In some embodiments of the camera device for use in a storage, the case is provided with:
a battery storage having an opening and configured to receive a battery inserted through the opening, and
a lid configured to open and close the opening of the battery storage, the opening and the lid having a water proof element comprising a packing disposed therebetween.

In some embodiments of the camera device for use in a storage, the lid is screw mounted on the opening of the battery storage.

In some embodiments of the camera device for use in a storage, the packing comprises a silicone rubber.

In some embodiments of the camera device for use in a storage, an outer housing of the image capturing element is fitted with the image capture window and a water proof element comprising an O ring is disposed between the outer housing and the image capture window.

In some embodiments of the camera device for use in a storage, the first surface of the case where the image capture window is located is covered by a sheet of cover member.

In some embodiments of the camera device for use in a storage, the cover member is provided with a hole only on a portion opposing the image capture window configured to allow the image capture window to face the outside of the cover member.

In some embodiments of the camera device for use in a storage, the cover member is bonded to the first surface portion of the case.

In some embodiments of the camera device for use in a storage, an illuminance sensor is provided inside the case, the first surface portion of the case having an illuminance sensor window to allow the illuminance sensor to face the outside of the case, wherein the cover member comprises a transparent material, the cover member having a design printed thereon, the design not being printed on a portion of the cover member facing the illuminance sensor window.

In some embodiments of the camera device for use in a storage, the cover member is bonded on the first surface portion of the case by a double-stick tape, and wherein the design is printed on the surface of the cover member bonding with the case.

In some embodiments of the camera device for use in a storage, a push switch is provided inside the case, wherein the case is provided with a switch through hole configured to allow operation of an operating portion of the switch from outside the case, the switch through hole being covered by a water proof element comprising a switch cover.

In some embodiments of the camera device for use in a storage, the switch cover is bonded on a surface of the case where the switch through hole is located to cover the switch through hole.

In some embodiments of the camera device for use in a storage, a design is printed on the switch cover, the design being printed on a surface of the switch cover bonding with the case.

In some embodiments of the camera device for use in a storage, a reed switch is provided near an inner surface of a first wall of the case and an operating member provided with a magnet is provided movably on an outer surface of the first wall, the operating member being movable between a position opposing the reed switch over the first wall and a position not opposing the reed switch over the first wall, the first wall isolating the reed switch and the operating member serving as the water proof element.

In some embodiments of the camera device for use in a storage, an outermost surface of the image capturing element is retracted from an outermost portion of the image capture window.

In some embodiments of the camera device for use in a storage, a water proof element comprising a water proof sheet is provided in a front side of the lens of the image capturing element.

In some embodiments of the camera device for use in a storage, a battery is provided to the case, the battery comprising a lithium battery.

In some embodiments of the camera device for use in a storage, a battery is provided to the case, the battery comprising a primary battery.

In some embodiments of the camera device for use in a storage, the battery is disposed in a lower portion of the case.

In some embodiments of the camera device for use in a storage, the preventing element comprises a switch.

In some embodiments of the camera device for use in a storage, the image capturing element is provided with a wide-angle lens.

In some embodiments of the camera device for use in a storage, the image capturing element is located below the vertical center of the case.

In some embodiments of the camera device for use in a storage, the lens is provided at a location retracted from the first surface portion of the case.

In some embodiments of the camera device for use in a storage, the first surface portion of the case is provided with a projection projecting further toward an outer side of the case compared to the lens.

In some embodiments of the camera device for use in a storage, a sheet comprising a transparent material is provided in a direction of image capturing of the lens.

In some embodiments of the camera device for use in a storage, the lens comprises a wide-angle lens, wherein the image capturing element is configured to capture image in a range that does not capture image of edges of the image capture window.

In some embodiments of the camera device for use in a storage, the plate member provided to the storage comprises a transparent material.

In some embodiments of the camera device for use in a storage, an operating portion of a switch is provided on the first surface portion of the case, the operating portion being coplanar with or retracted with respect to the first surface portion.

In some embodiments of the camera device for use in a storage, an illuminance sensor is provided on the first surface portion of the case.

In some embodiments of the camera device for use in a storage, an illuminance sensor is provided on a surface different from the first surface portion of the case.

In some embodiments of the camera device for use in a storage, the case is shaped like a cuboid.

In some embodiments of the camera device for use in a storage, the image capture window is formed at a central portion of the case.

In some embodiments of the camera device for use in a storage, the plural image capture lighting elements are disposed in locations sandwiching the image capture window.

In some embodiments of the camera device for use in a storage, the plural image capture lighting elements are disposed in the periphery of the image capture window and distanced equally from the image capture window.

In some embodiments of the camera device for use in a storage, an illuminance sensor is provided on the first surface portion of the case and a lighting element is provided to the storage, wherein light receiving properties of the illuminance sensor is substantially the same as light emitting properties of the lighting element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera device for use in a storage unit comprising:
a case configured to be installable inside a storage unit;
an image capturing element provided inside the case and configured to capture an image inside the storage unit where the case is installed;
an image capture window provided on a first surface portion of the case, the image capture window configured for capturing the image inside the storage unit by the image capturing element; and
a communication element provided inside the case and configured to transmit the image captured by the image capturing element to the outside of the storage unit by wireless communication;
wherein the communication element disposed in the case is located more toward an outer side of the storage unit compared to the image capturing element.

2. The camera device according to claim 1, further comprising a substrate on which an image capturing device of the image capturing element is mounted, wherein the substrate is located more toward an inner side of the storage unit compared to the communication element.

3. The camera device according to claim 2, wherein the image capturing element, the substrate, and the communication element are organized into a unit, wherein the unit is provided with a battery disposed in a location not covering the communication element.

4. The camera device according to claim 3, wherein the image capturing element, the substrate, and the communication element are stored in the case, wherein the case is made of nonmetal material.

5. The camera device according to claim 4, wherein a metal member is not disposed on a portion of a door of the storage unit facing the communication element.

6. The camera device according to claim 1 being installed in the storage unit configured to store food as a food storage unit camera device, the camera device comprising a water proof element configured to water-tightly seal between the inside of the case and the outside of the case.

7. The camera device according to claim 6, wherein a connection terminal, configured to connect an electrical component, or a battery is provided inside the case, wherein the connection terminal or the battery is distanced from an inner surface of the case, or
wherein the substrate located inside the case is distanced from the inner surface of the case.

8. The camera device according to claim 1 installed on a door of the storage unit wherein a center of gravity of the camera device is displaced from the center of the case.

9. The camera device according to claim 8, further comprising a battery, wherein the case is provided with a preventing element on an outer surface thereof located on the opposite side of the case from where the battery is located, the preventing element being configured to prevent the case from being placed on another object through the outer surface.

10. The camera device according to claim 8, wherein the case is mounted on a holder case shaped like an open top box, a wall of the holder case located proximal to an inner side of the storage unit being longer than half of the height of the case.

11. The camera device according to claim 8, further comprising a switch, wherein the switch is not a slide switch, or further comprising a first slide switch disposed on the door and being configured to be turned on and off by a sliding operation of an operator, wherein the operator of the first slide switch is configured to slide in the up and down direction, the first slide switch being turned on when the operator is slid downward, or further comprising a second slide switch disposed on the door and being configured to be turned on and off by a sliding operation, wherein the second slide switch is configured to slide in a direction other than the up and down direction, or further comprising a third slide switch configured to be turned on and off by a sliding operation, wherein the third slide switch is configured to slide in a direction in which the door is opened and closed, the direction in which the third slide switch is turned on being the direction in which the door is closed, or wherein the door comprises a revolving door, the camera device further comprising a fourth slide switch configured to be turned on and off by a sliding operation, wherein the fourth slide switch is configured to slide in a direction substantially orthogonal to a direction in which the door is opened and closed, the direction in which the fourth slide switch is turned on being the direction oriented toward an opening and closing end of the door from the center of rotation of the door.

12. The camera device according to claim 8, wherein when the image capturing element is located at the center of the door, a range of image capturing by the image capturing element includes left and right edges in a far side of the storage unit or the upper and lower edges in the far side of the storage unit, or wherein when the image capturing element is located at the center of the door, a range of image capturing by the image capturing element includes left and right front end portions of a shelf disposed inside the storage unit, or front end portions of at least two adjacent shelves among multiple shelves disposed in the up and down direction inside the storage unit, or front end portions of the uppermost shelf and the lowermost shelf disposed inside the storage unit.

13. The camera device according to claim 8, wherein the image capturing element, the substrate, and the communication element are disposed in the listed sequence, wherein a battery is disposed below the image capturing element, the substrate, and the communication element.

14. The camera device according to claim 1 being installed in the storage unit provided with a plate member for placement of a stored item, wherein the case is placed on the plate member with the first surface portion facing the interior of the storage unit.

15. The camera device according to claim 14, wherein the image capturing element is provided with a lens disposed at the image capture window, the lens not contacting the plate member.

16. The camera device according to claim 15, wherein the lens comprises a wide-angle lens, and the plate member comprises plural shelves each being substantially horizontal, and wherein when the first surface portion of the case is disposed facing downward at the center of an upper surface of the uppermost shelf, a range of image capturing by the image capturing element includes left and right edges of a bottom surface of the storage unit or front and rear edges of the bottom surface of the storage unit, or wherein the lens comprises a wide-angle lens and the plate member comprises an upper storage container and a lower storage container, and wherein when the first surface portion of the case is disposed facing downward at the center of a bottom portion of the upper storage container, a range of image capturing by the image capturing element includes left and right edges of a bottom surface of the lower container or front and rear edges of the bottom surface of the lower container.

17. The camera device according to claim 14, wherein plural image capture lighting elements configured to illuminate the interior of the storage unit are provided on the first surface portion of the case in the periphery of the image capture window.

18. A storage unit comprising the camera device according to claim 1.

* * * * *